(12) United States Patent
Fukuma et al.

(10) Patent No.: US 10,551,550 B2
(45) Date of Patent: Feb. 4, 2020

(54) ILLUMINATION DEVICE AND DISPLAY DEVICE

(71) Applicant: Japan Display Inc., Minato-ku (JP)

(72) Inventors: Toshihiko Fukuma, Tokyo (JP); Shinichi Komura, Tokyo (JP); Youichi Asakawa, Tokyo (JP); Ken Onoda, Tokyo (JP)

(73) Assignee: Japan Display Inc., Minato-ku (JP)

( * ) Notice: Subject to any disclaimer, the term of this patent is extended or adjusted under 35 U.S.C. 154(b) by 178 days.

(21) Appl. No.: 15/700,606

(22) Filed: Sep. 11, 2017

(65) Prior Publication Data
US 2018/0074252 A1    Mar. 15, 2018

(30) Foreign Application Priority Data

Sep. 12, 2016  (JP) .................................. 2016-177698
Mar. 17, 2017  (JP) .................................. 2017-053034

(51) Int. Cl.
*F21V 8/00*    (2006.01)

(52) U.S. Cl.
CPC ......... *G02B 6/0053* (2013.01); *G02B 6/0055* (2013.01); *G02B 6/0068* (2013.01)

(58) Field of Classification Search
CPC .. G02B 6/0035; G02B 6/0055; G02B 6/0038; G02B 6/0033; G02B 6/0036; G02B 6/0046; G02B 6/002; G02B 6/0015; F02F 1/133615
See application file for complete search history.

(56) References Cited

U.S. PATENT DOCUMENTS

| 7,277,079 | B2 * | 10/2007 | Kobayashi | G02B 6/0076 345/102 |
| 7,374,329 | B2 * | 5/2008 | Feng | G02B 6/0016 349/65 |
| 7,826,703 | B2 * | 11/2010 | Iwasaki | G02B 6/0038 362/613 |
| 7,850,357 | B2 * | 12/2010 | Kim | G02B 6/0028 349/65 |
| 9,010,984 | B2 * | 4/2015 | Yamada | G02B 6/0038 362/613 |
| 9,952,373 | B2 * | 4/2018 | Liu | G02B 6/0026 |
| 2004/0124764 | A1 * | 7/2004 | Suzuki | G02B 6/0038 313/498 |

(Continued)

FOREIGN PATENT DOCUMENTS

| JP | 2004-38108 | 2/2004 |
| JP | 2011-238484 | 11/2011 |

*Primary Examiner* — Peggy A Neils
(74) *Attorney, Agent, or Firm* — Oblon, McClelland, Maier & Neustadt, L.L.P.

(57) ABSTRACT

In one embodiment, an illumination device includes a light guide, a light source and prisms. The light guide has a side surface and first and second main surfaces. The light source emits light to the side surface in a first emission direction. The prisms are provided on the second main surface. The second main surface has first and second areas. The prisms include first prisms in the first area and second prisms in the second area. A first virtual line connecting apexes of the first prisms is inclined with respect to the first main surface. A distance between the second area and the first main surface is greater than a distance between the first area and the first main surface.

16 Claims, 15 Drawing Sheets

(56) References Cited

U.S. PATENT DOCUMENTS

2005/0180167 A1* 8/2005 Hoelen ............... G02B 6/0046
362/613
2007/0147083 A1* 6/2007 Hwang ............... G02B 6/0038
362/613
2016/0363716 A1* 12/2016 You ..................... G02B 6/0068

* cited by examiner

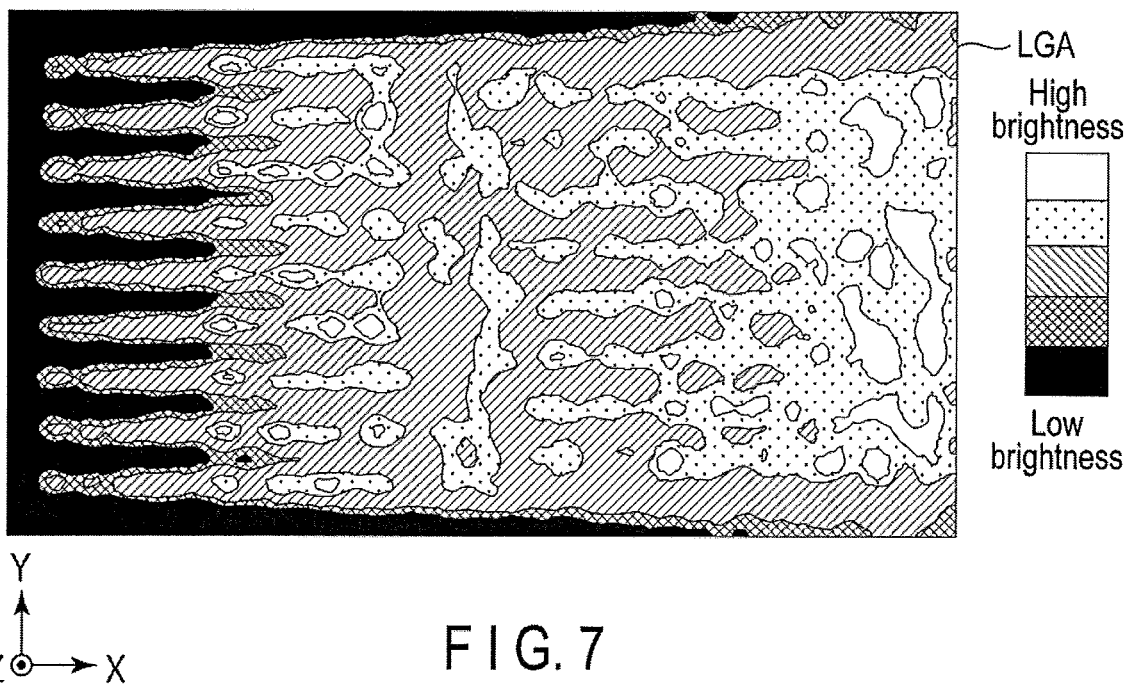
F I G. 7
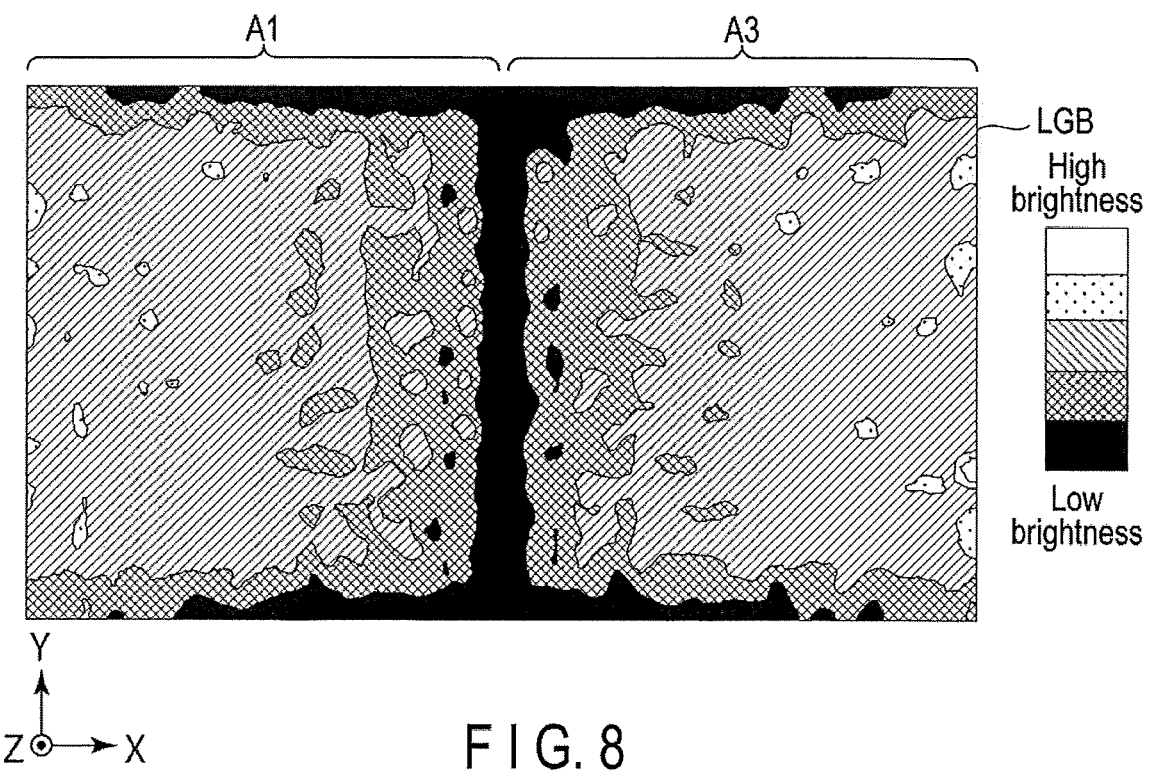
F I G. 8

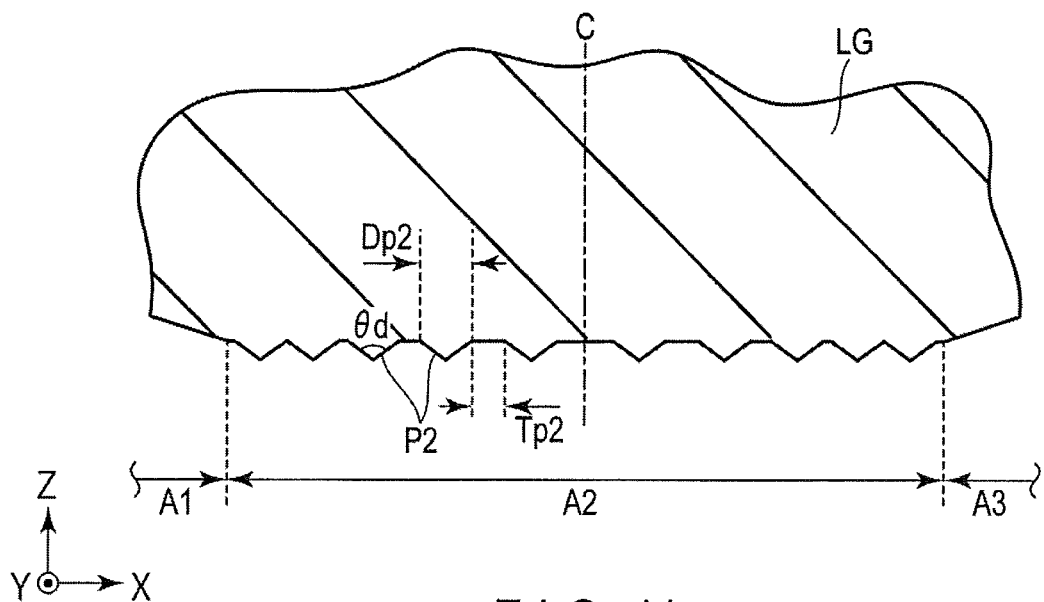
F I G. 11
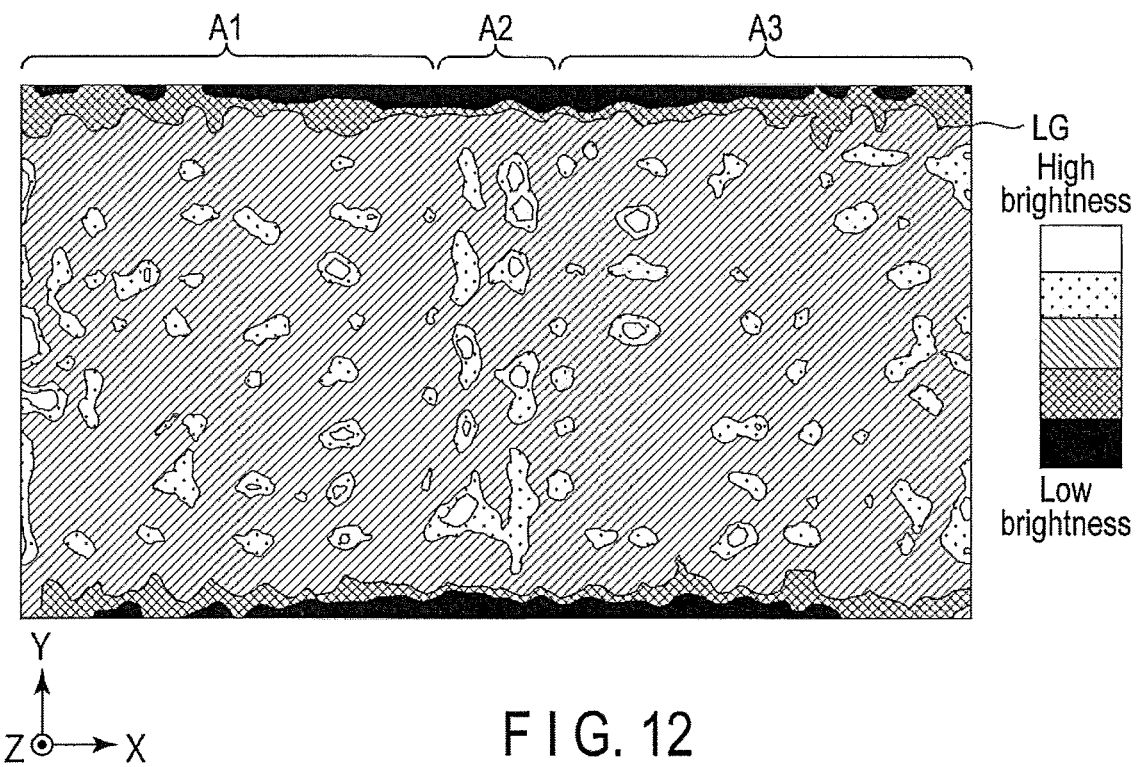
F I G. 12

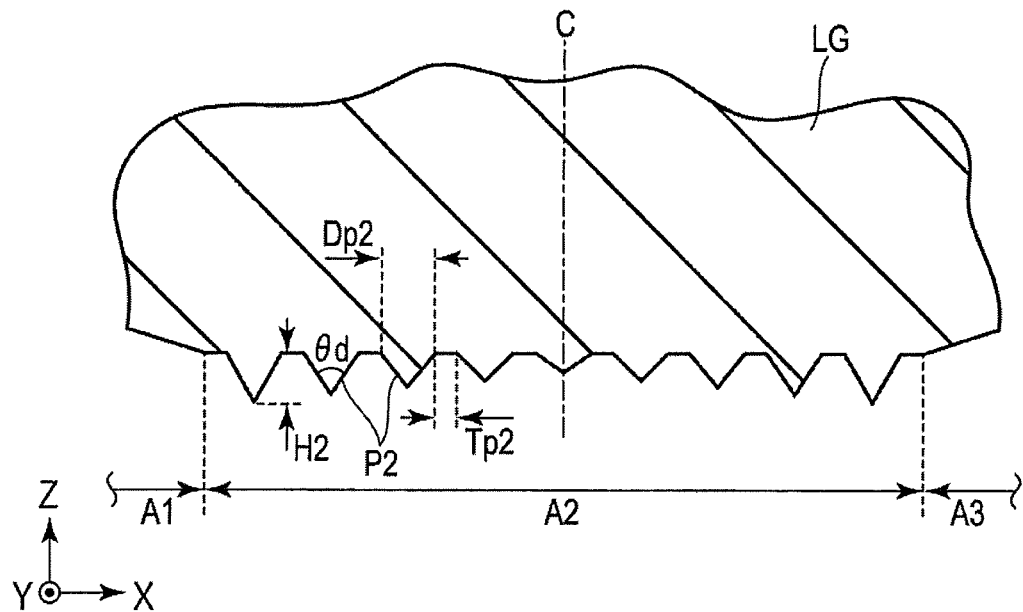
F I G. 13
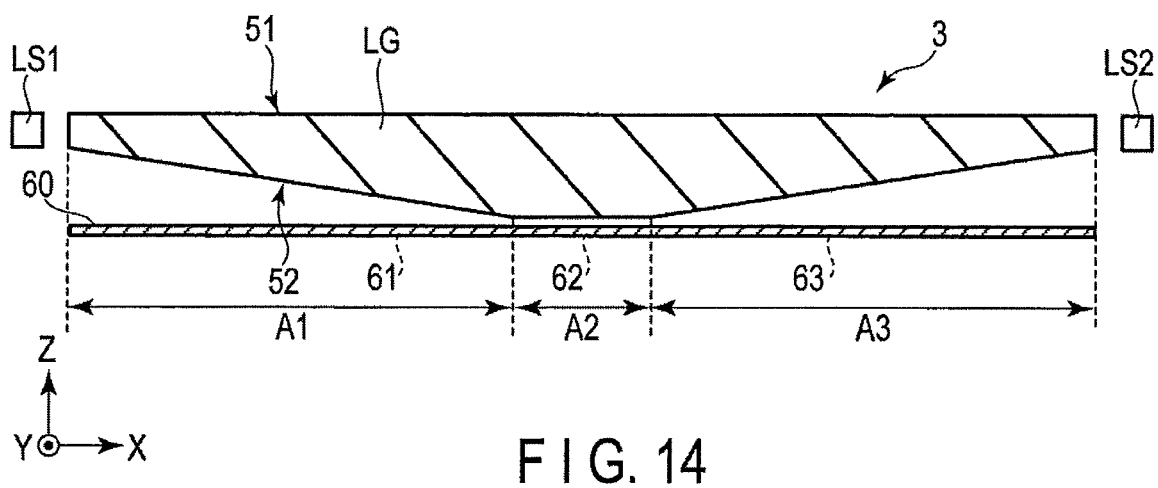
F I G. 14

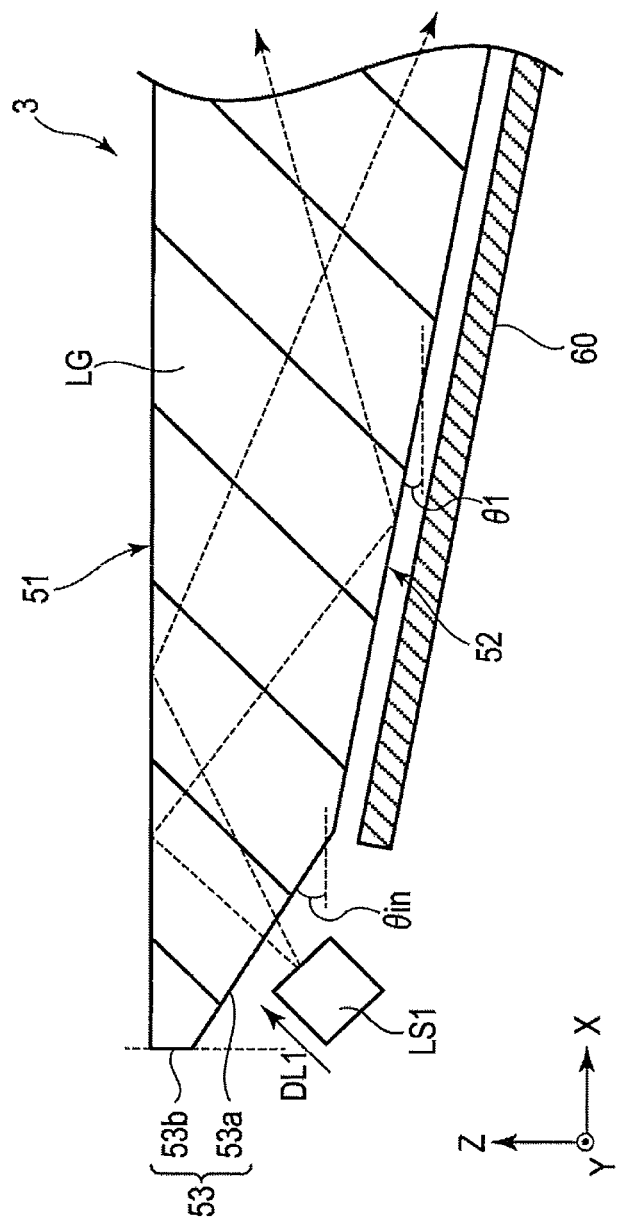
F I G. 22

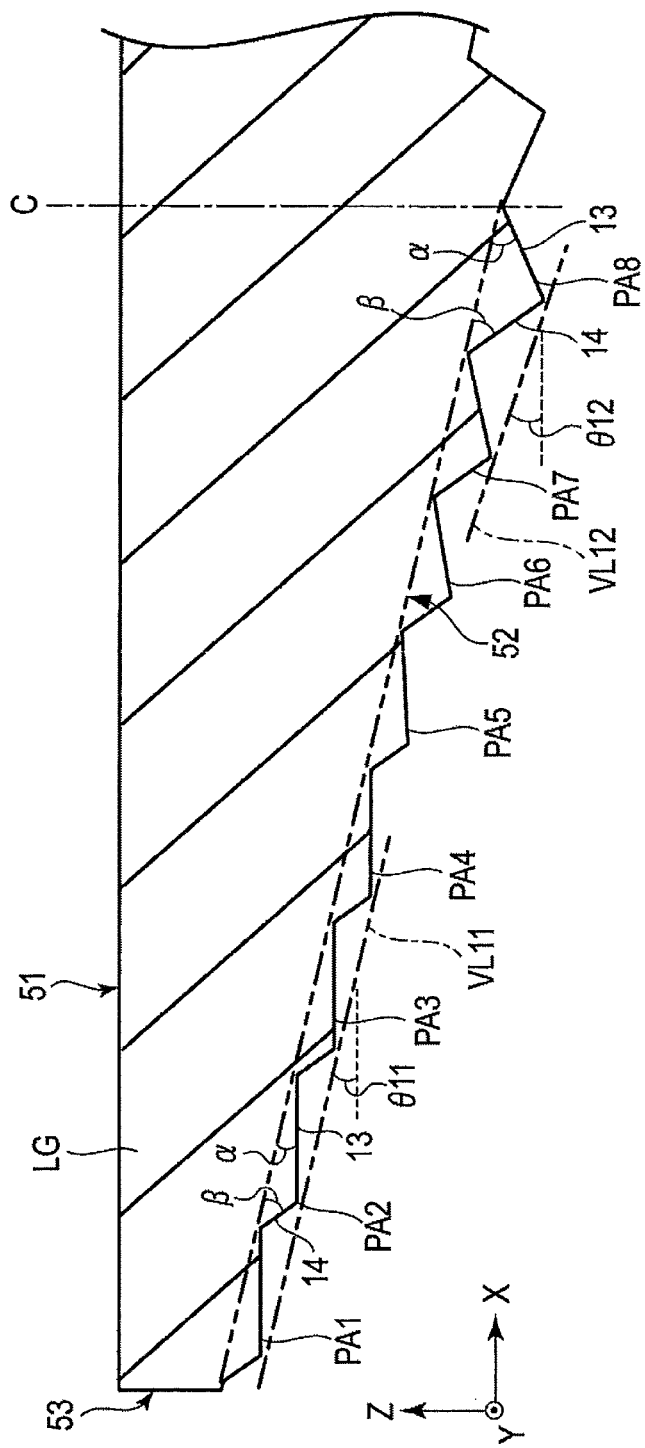
F I G. 25

ILLUMINATION DEVICE AND DISPLAY DEVICE

CROSS-REFERENCE TO RELATED APPLICATIONS

This application is based upon and claims the benefit of priority from Japanese Patent Applications No. 2016-177698, filed Sep. 12, 2016, and No. 2017-053034, filed Mar. 17, 2017, the entire contents of all of which are incorporated herein by reference.

FIELD

Embodiments described herein relate generally to an illumination device and a display device.

BACKGROUND

For example, a display device such as a liquid crystal display device includes a display panel which has a pixel, and an illumination device such as a backlight which illuminates the display panel. The illumination device includes a light source which emits light, and a light guide to which the light from the light source is emitted. The light from the light source enters the light guide from a side surface, travels through the light guide, and exits from an emission surface which corresponds to one main surface of the light guide.

If the brightness of the emission surface of the light guide is uneven, the quality of an image displayed by the display panel may be degraded. For example, if the viewing angle of the light emitted from the light source is narrow, desirable brightness may not be produced in an area near the light source on the emission surface of the light guide. In this case, light having sufficient intensity cannot be supplied to the display panel in the area near the light source on the emission surface.

BRIEF DESCRIPTION OF THE DRAWINGS

FIG. 7 is a diagram showing brightness distribution of a light guide according to a comparative example.

FIG. 8 is a diagram showing brightness distribution of a light guide according to another comparative example.

FIG. 11 is a diagram showing an example of adjustment of the density of the second prisms according to the first embodiment.

FIG. 12 is a diagram showing brightness distribution of the light guide where the density is adjusted as shown in FIG. 11.

FIG. 13 is a diagram showing an example of adjustment of the shape of the second prisms according to the first embodiment.

FIG. 14 is a diagram schematically showing the structure of an illumination device according to a second embodiment.

FIG. 22 is a schematic sectional view of a part of an illumination device according to a seventh embodiment.

FIG. 25 is an enlarged sectional view of a part of the light guide shown in FIG. 24.

DETAILED DESCRIPTION

Figure 1:
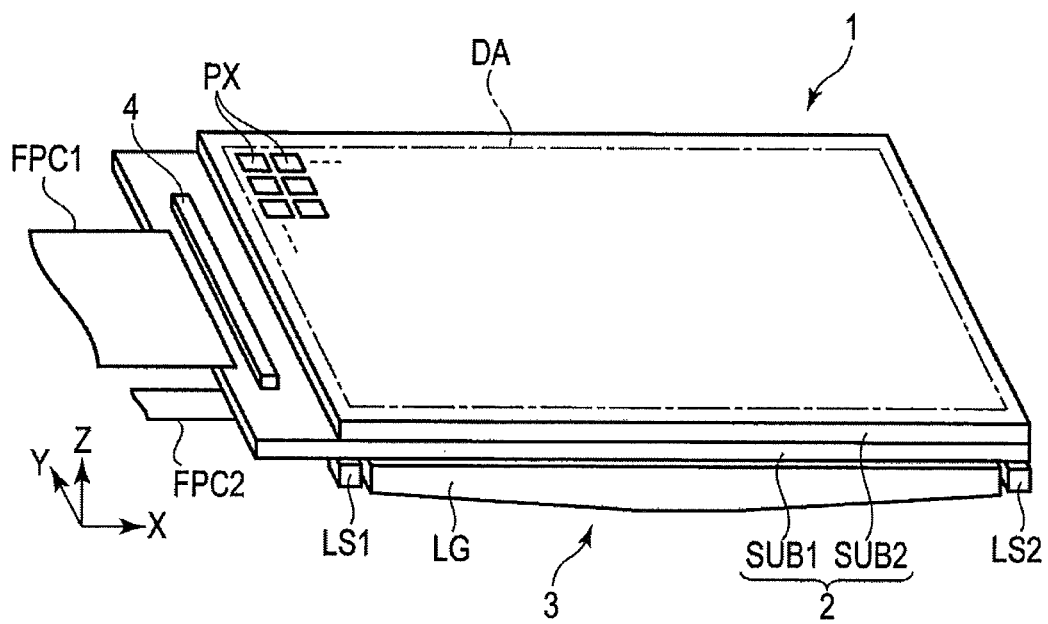
FIG. 1 is a perspective diagram schematically showing the structure of a display device according to a first embodiment.

In general, according to one embodiment, an illumination device includes a light guide, a first light source and a plurality of prisms. The light guide has a first side surface, a first main surface and a second main surface opposite to the first main surface. The first light source emits light to the first side surface of the light guide in a first emission direction. The prisms are provided on the second main surface. The second main surface has a first area and a second area which are arranged in order in the first emission direction. The prisms include a plurality of first prisms in the first area and a plurality of second prisms in the second area. In a sectional view, a first virtual line connecting apexes of the first prisms is inclined with respect to the first main surface. In a sectional view, a distance between the second area and the first main surface is greater than a distance between the first area and the first main surface.

According to this structure, an illumination device which emits light having excellent intensity distribution from an emission surface of a light guide, and a display device which includes the illumination device can be produced.

Embodiments are described with reference to the accompanying drawings.

The disclosure is merely an example, and proper changes in keeping with the spirit of the invention, which are easily conceivable by a person of ordinary skill in the art, come within the scope of the invention as a matter of course. In addition, in some cases, in order to make the description clearer, the respective parts are illustrated schematically in the drawings, rather than as an accurate representation of what is implemented. However, such schematic illustration is merely exemplary, and in no way restricts the interpretation of the invention. In the drawings, reference numbers of continuously arranged elements equivalent or similar to each other are omitted in some cases. In addition, in the specification and drawings, structural elements which function in the same or a similar manner to those described in connection with preceding drawings are denoted by like reference numbers, detailed description thereof being omitted unless necessary.

In the embodiments, a transmissive liquid crystal display device will be described as an example of the display device. Further, a backlight of a liquid crystal display device will be described as an example of the illumination device. However, the embodiments do not preclude the application of individual technical ideas disclosed in the embodiments to other display devices and illumination devices. The other display devices include, for example, a liquid crystal display device having not only the transmissive display function but also the reflective display function of reflecting external light and using the reflection light for display, a display device including a mechanical display panel where a microelectromechanical systems (MEMS) shutter functions as an optical element, and the like. The other illumination devices include, for example, a front light arranged on the front surface of the display device, and the like. Further, the illumination device may be used not for the purpose of illuminating the display device but for other purposes.

Firth Embodiment

FIG. 1 is a perspective diagram schematically showing the structure of a display device 1 according to a first embodiment. The display device 1 can be used in various devices such as a smartphone, a tablet computer, a mobile phone, a personal computer, a television receiver, a vehicle-mounted device, a game console and a wearable device.

The display device 1 includes a display panel 2, an illumination device 3 which is a backlight, a driver IC chip 4 which drives the display panel 2, and flexible printed circuits FPC1 and FPC2 which transmit control signals to the display panel 2 and the illumination device 3. For example, the flexible printed circuits FPC1 and FPC2 are connected to a control module which controls the operations of the display panel 2 and the illumination device 3.

The display panel 2 includes a first substrate SUB1 (array substrate) and a second substrate SUB2 (counter-substrate) opposed to the first substrate SUB1. The display panel 2 has a display area DA which displays an image. The display panel 2 includes, for example, a plurality of pixels PX arranged in a matrix in the display area DA.

The illumination device 3 includes a first light source LS1, a second light source LS2, and a light guide LG which is opposed to the first substrate SUB1. The first light source LS1 is opposed to one side surface of the light guide LG, and the second light source LS2 is opposed to the other side surface of the light guide LG. Although one light source LS1 and one light source LS2 are shown in FIG. 1, in practice, a plurality of first light sources LS1 and a plurality of second light sources LS2 are provided (see FIG. 3).

A first direction X, a second direction Y and a third direction Z are defined as shown in FIG. 1. These directions X, Y and Z are, for example, orthogonal to each other. In the description, a view of the display device 1 from a direction parallel to the third direction Z is referred to as a plan view. Further, a sectional view of the display device 1 parallel to an X-Z plane is referred to as a sectional view. In the example shown in FIG. 1, the substrates SUB1 and SUB2 and the light guide LG have long sides in the first direction X and short sides in the second direction Y and are in the shape of a rectangle in a plan view. However, the shape of the substrates SUB1 and SUB2 and the light guide LG is not limited to this and may be another shape such as a square or a circle.

Figure 2:
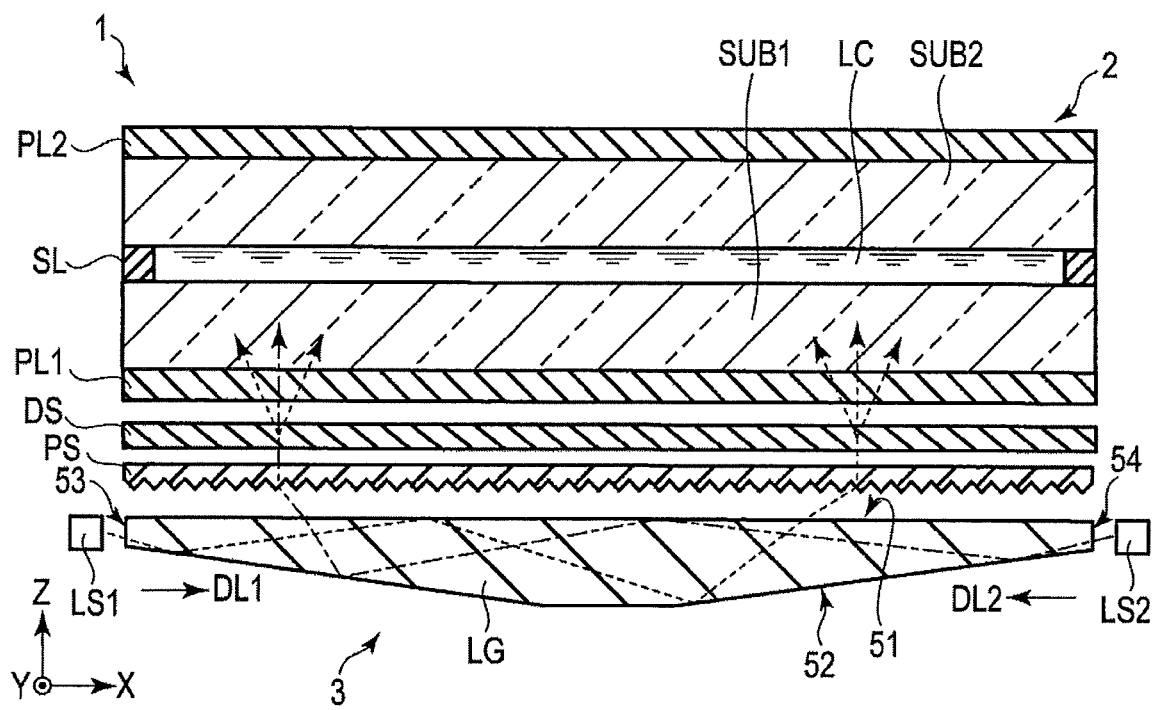
FIG. 2 is a schematic sectional view of the display device according to the first embodiment.

FIG. 2 is a schematic sectional view of the display device 1 parallel to the X-Z plane. The display panel 2 further includes a seal member SL and a liquid crystal layer LC. The substrates SUB1 and SUB2 are attached to each other by the seal member SL. The liquid crystal layer LC is sealed between the seal member SL and the substrates SUB1 and SUB2.

A first polarizer PL1 is attached to the lower surface (surface opposed to the light guide LG) of the first substrate SUB1. A second polarizer PL2 is attached to the upper surface (surface which is not opposed to the first substrate SUB1) of the second substrate SUB2. The polarization axes of the polarizers PL1 and PL2 are orthogonal to each other.

The light guide LG has a first main surface 51 opposed to the display panel 2, a second main surface 52 opposite to the first main surface 51, a first side surface 53, and a second side surface 54 opposite to the first side surface 53. The first light source LS1 is opposed to the first side surface 53, and the second light source LS2 is opposed to the second side surface 54. The widths and the angles of light from the light sources LS1 and LS2 may be adjusted by further providing optical elements such as lenses between the first light source LS1 and the first side surface 53 and between the second light source LS2 and the second side surface 54.

The first light source LS1 emits diffuse light having a spread which is centered on a first emission direction DL1, to the first side surface 53. The second light source LS2 emits diffuse light having a spread which is centered on a second emission direction DL2, to the second side surface 54. The emission light directions DL1 and DL2 are, for example, opposite to each other and parallel to the first direction X. As the light emitting element of each of the light sources LS1 and LS2, for example, a laser light source such as a semiconductor laser which emits polarized laser light can be used. The light emitting element of each of the light sources LS1 and LS2 is not limited to that which emits laser light but may be, for example, a light-emitting diode.

Each of the light sources LS1 and LS2 may include a plurality of light emitting elements which emit light of different colors, respectively. For example, if each of the light sources LS1 and LS2 includes three light emitting elements which emit red light, green light and blue light, light of a mixture of these colors (for example, white) can be obtained.

The display device 1 includes a prism sheet PS between the display panel 2 and the light guide LG. Further, the display device 1 includes a diffusion sheet DS (diffusion layer) between the prism sheet PS and the display panel 2. For example, the prism sheet PS includes a plurality of prisms extending parallel to the second direction Y. These prisms are formed, for example, on the lower surface (surface opposed to the light guide LG) of the prism sheet PS. Note that these prisms may be formed on the upper surface (surface opposed to the display panel 2) of the prism sheet PS.

In FIG. 2, an example of the optical path of the light emitted from the first light source LS1 is shown by dashed lines, and an example of the optical path of the light emitted from the second light source LS2 is shown by dashed-dotted lines. The light emitted from the first light source LS1 is emitted to the light guide LG from the first side surface 53, is transmitted through the light guide LG while the light is reflected off the main surfaces 51 and 52, and is eventually emitted from the first main surface 51 when the light is deviated from the total internal reflection condition. The light emitted from the second light source LS2 is emitted to the light guide LG from the second side surface 54, is transmitted through the light guide LG while the light is reflected off the main surfaces 51 and 52, and is eventually emitted from the first main surface 51 when the light is deviated from the total internal reflection condition. In this way, the first main surface 51 corresponds to the emission surface from which the light is emitted.

The prism sheet PS converts the light output from the first main surface 51, into light which is substantially parallel to the third direction Z. Here, the "light which is substantially parallel to the third direction Z" not only includes light which is precisely parallel to the third direction Z but also includes light whose gradient with respect to the third direction Z is sufficiently reduced by the conversion by the prism sheet PS as compared to what it is when the light is output from the first main surface 51. In light of maintaining the polarization of the light from the light sources LS1 and LS2, the prisms of the prism sheet PS should preferably be formed on the lower surface of the prism sheet PS. The light transmitted through the prism sheet PS is diffused by the diffusion sheet DS and emitted to the display panel 2. Even if the viewing angle of the light transmitted through the prism sheet PS is narrow, the viewing angle can be increased by diffusing the light by the diffusion sheet DS.

If the light from the light sources LS1 and LS2 reaches the display panel 2 in a sufficiently-polarized state, the first polarizer PL1 may be omitted. If the first polarizer PL1 is omitted, for example, the see-through display device 1, that is, the so-called transparent liquid crystal display device can be obtained by increasing the transparency of the substrates SUB1 and SUB2.

Figure 3:
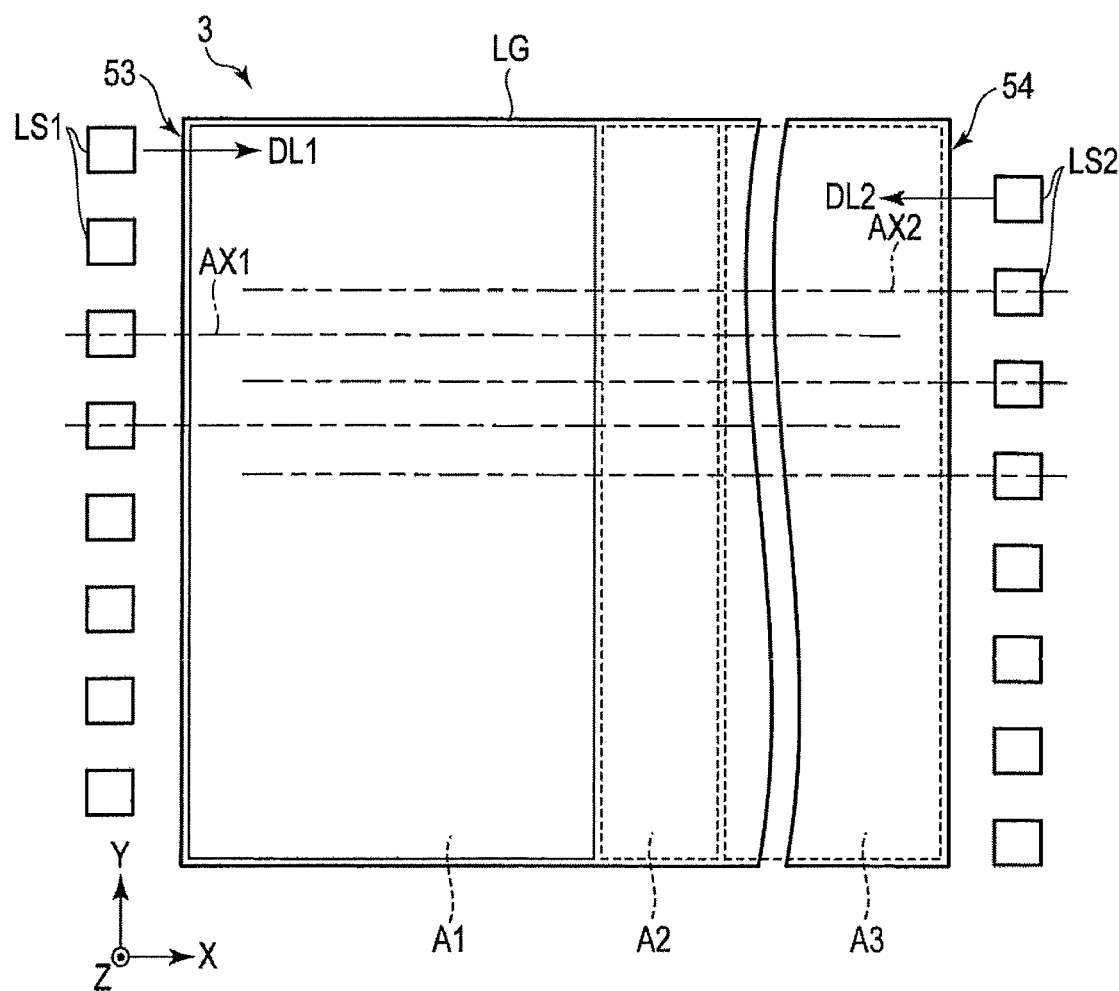
FIG. 3 is a schematic plan view of an illumination device according to the first embodiment.

FIG. 3 is a schematic plan view of the illumination device 3. In the example shown in the drawing, eight first light sources LS1 are arranged along the first side surface 53, and eight second light sources LS2 are arranged along the second side surface 54. The light emitted from the first light source LS1 has the highest intensity on a first optical axis AX1, and the light emitted from the second light source LS2 has the highest intensity on a second optical axis AX2.

As shown in the drawing, the light sources LS1 and LS2 are alternately arranged in the second direction Y. That is, the first optical axis AX1 of the light emitted from the first light source LS1 in the first emission direction DL1 and the second optical axis AX2 of the light emitted from the second light source LS2 in the second emission direction DL2 are deviated from each other in the second direction Y. Note that the first optical axis AX1 and the second optical axis AX2 may be aligned with each other in the second direction Y instead.

Figure 4:
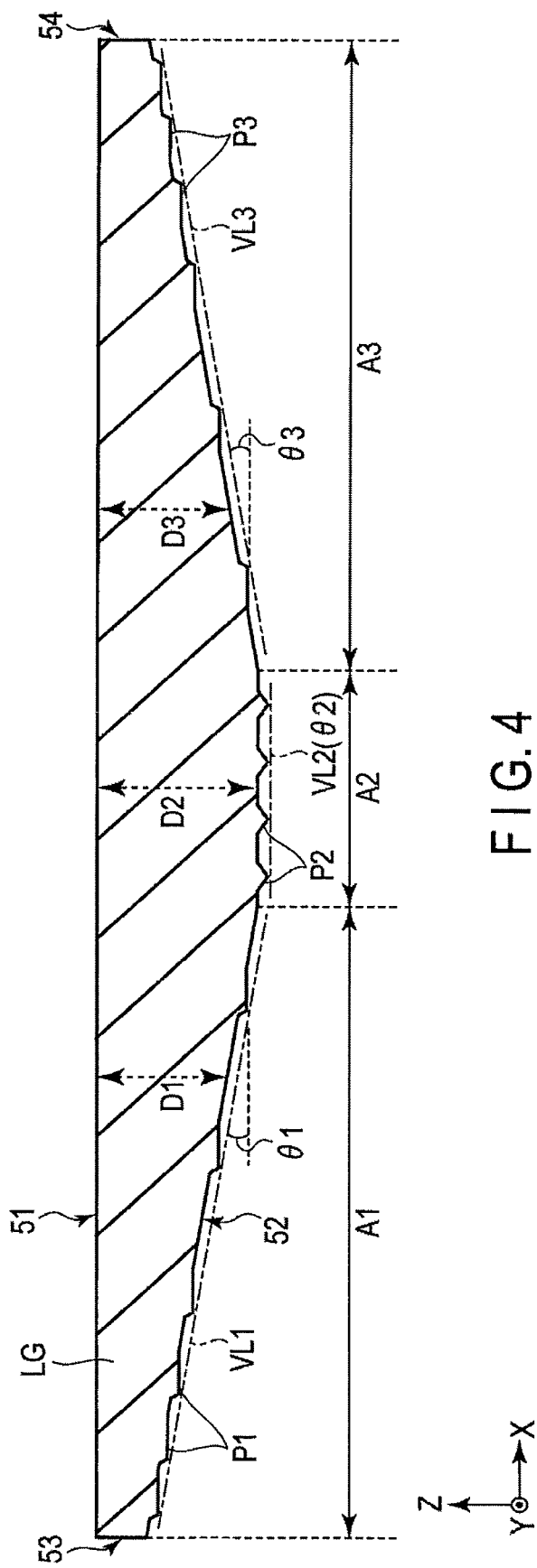
FIG. 4 is a schematic sectional view of a light guide according to the first embodiment.

FIG. 4 is a schematic sectional view of the light guide LG parallel to the X-Z plane. The first main surface 51 of the light guide LG is a surface parallel to the first direction X and the second direction Y. The second main surface 52 has a first area A1, a second area A2 and a third area A3. As shown in the plan view of FIG. 3, the first area A1 is provided on the first side surface 53 side from one end to the other end of the light guide LG in the second direction Y. The third area A3 is provided on the second side surface 54 side from one end to the other end of the light guide LG in the second direction Y. The second area A2 is provided between the first area A1 and the third area A3 from one end to the other end of the light guide LG in the second direction Y. The first area A1, the second area A2 and the third area A3 are arranged in this order in the first emission direction D1. For example, the width of the first area A1 and the width of the third area A3 are the same as each other in the first direction X. Further, the width of the second area A2 is less than the widths of the areas A1 and A3 in the first direction X. Note that the widths of the areas A1 and A3 may be different from each other and that the width of the second area A2 may be greater than or equal to the widths of the areas A1 and A3.

As shown in FIG. 4, the first area A1 and the third area A3 are inclined with respect to the first main surface 51. The second area A2 is parallel to the first main surface 51. Here, "parallel" includes a case where the second area A2 is inclined with respect to the first main surface 51 at an angle which is sufficiently less than angles at which the areas A1 and A3 are inclined with respect to the first main surface 51 (a case where the second area A2 is substantially parallel to the first main surface 51).

A plurality of prisms P are provided on the second main surface 52. The prisms P includes a plurality of first prisms P1 in the first area A1, a plurality of second prisms P2 in the second area A2 and a plurality of third prisms P3 in the third area A3. The prisms P1, P2 and P3 extend in the second direction Y. The cross-sectional shape of the first prisms P1 is, for example, uniform in the second direction Y but may be variable instead. The same may be said of the second prisms P2 and the third prisms P3.

For example, the shape of the first prisms P1 and the shape of the second prisms P2 are different from each other. Further, the shape of the third prisms P3 and the shape of the second prisms P2 are different from each other. The first prisms P1 and the third prisms P3 may have the same shape (including a symmetrical shape).

For example, the first prisms P1 and the second prisms P2 are arranged at different densities. Further, the third prisms P3 and the second prisms P2 are arranged at different densities. The first prisms P1 and the third prisms P3 may be arranged at the same density.

In a sectional view, a line segment which connects the apexes of the first prisms P1 is referred to as a first virtual line VL1, a line segment which connects the apexes of the second prisms P2 is referred to as a second virtual line VL2, and a line segment which connects the apexes of the third prisms P3 is referred to as a third virtual line VL3. In the example shown in FIG. 4, all of the virtual lines VL1, VL2 and VL3 are straight lines. Note that the virtual lines VL1, VL2 and VL3 may be at least partially bent or may be curved instead.

The first virtual line VL1 is inclined at a first angle $\theta 1$ with respect to the first main surface 51. The third virtual line VL3 is inclined at a third angle $\theta 3$ with respect to the first main surface 51. Both of the angles $\theta 1$ and $\theta 3$ are acute angles. For example, the first angle $\theta 1$ and the third angle $\theta 3$ are substantially the same as each other ($\theta 1 \approx \theta 3$). Note that the first angle $\theta 1$ and the third angle $\theta 3$ may be different from each other ($\theta 1 \neq \theta 3$).

The second virtual line VL2 is inclined with respect to the virtual lines VL1 and VL3. A second angle $\theta 2$ between the second virtual line VL2 and the first main surface 51 is less than the angles $\theta 1$ and $\theta 3$ ($\theta 2 < \theta 1, \theta 3$). In the example shown in FIG. 4, the second virtual line VL2 is parallel to the first main surface 51. Here, "parallel" includes, in addition to a case where the second angle $\theta 2$ is zero, a case where the second angle $\theta 2$ is sufficiently less than the angles $\theta 1$ and $\theta 3$ (a case where the second virtual line VL2 is substantially parallel to the first main surface 51).

Here, the thickness of the light guide LG in the first area A1 (distance between the first area A1 and the first main surface 51) is defined as D1, the thickness of the light guide LG in the second area A2 (distance between the second area A2 and the first main surface 51) is defined as D2, and the thickness of the light guide LG in the third area A3 (distance between the third area A3 and the first main surface 51) is defined as D3. The distance D1 increases from the first side surface 53 toward the boundary of the areas A1 and A2. The distance D3 increases from the second side surface 54 toward the boundary of the areas A2 and A3. In the example shown in FIG. 4, the distance D2 is constant.

In this shape, the distance D2 is greater than the distance D1 at any position in the first area A1 (D2>D1). Further, the distance D2 is greater than the distance D3 at any position in the third area A3 (D2>D3).

Figure 5:
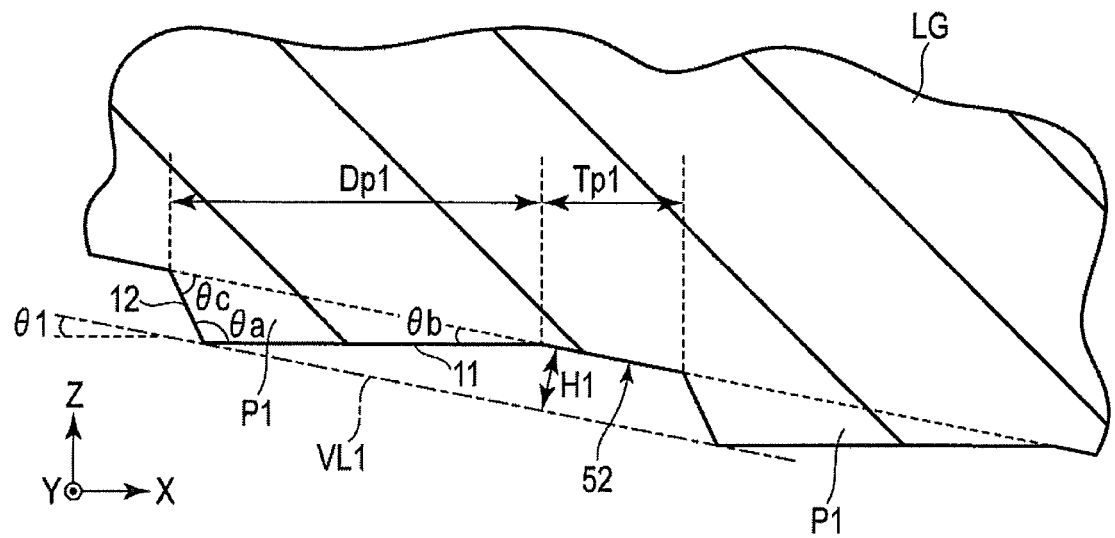
FIG. 5 is an enlarged sectional view of a first prism according to the first embodiment.

FIG. 5 is an enlarged sectional view of the first prism P1. The first prism P1 has a first inclined surface 11 and a second inclined surface 12 and has a triangle cross-section. The angle of the apex between these inclined surfaces 11 and 12 is θa. The angle between the second main surface 52 in the first area A1 and the first inclined surface 11 is θb. The angle between the second main surface 52 in the first area A1 and the second inclined surface 12 is θc. The width of the first prism P1 in the first direction X is Dp1, and the distance between the adjacent first prisms P1 in the first direction X is Tp1. The height of the first prism P1 is H1.

In the example shown in FIG. 5, the angle θa is an obtuse angle and the angles θb and θc are acute angles, and the following inequality: θa>θc>θb is established. For example, the first inclined surface 11 is parallel to the first main surface 51. In this case, the angle θb is the same as the above-described angle θ1. The shape of the first prisms P1 in the first area A1 may be the same in all of the first prisms P1 or may vary at least in a part of the first prisms P1.

The structure of each third prism P3 in the third area A3 is also the same as that of the above-described first prism P1.

In areas where the first prisms P1 and the third prisms P3 are provided at high densities, the amount of light output from the first main surface 51 can be increased. Further, in general, the brightness of the emission surface tends to decrease at the ends of the light guide. In light of these points, as shown in FIG. 4, the density of the first prisms P1 in the first area A1 may be increased from the boundary of the areas A1 and A2 toward the first side surface 53. Similarly, the density of the third prisms P3 in the third area A3 may be increased from the boundary of the areas A2 and A3 toward the second side surface 54.

Here, the density of the first prisms P1 can be defined, for example, as the number of the first prisms P1 per unit length. Alternatively, the density of the first prisms P1 can be expressed as the ratio between the width Dp1 of the first prism P1 and the distance Tp1 between the adjacent first prisms P1. The same may be said of the density of the third prisms P3.

Further, the apex angle θa or the height H1 of the first prisms P1 may be increased from the boundary of the areas A1 and A2 toward the first side surface 53. In this case, the density of the first prisms P1 in the first area A1 may be made constant.

Similarly, the apex angle or the height of the third prisms P3 may be increased from the boundary of the areas A2 and A3 toward the second side surface 54. In this case, the density of the third prisms P3 in the third area A3 may be made constant.

Note that the above-described adjustment of the density, the angle and the height are not necessarily applied to all the first prisms P1 and the third prisms P3. For example, the density, the angle and the height may vary in a part of the first prisms P1. Similarly, the density, the angle and the height may vary in a part of the third prisms P3.

Figure 6:
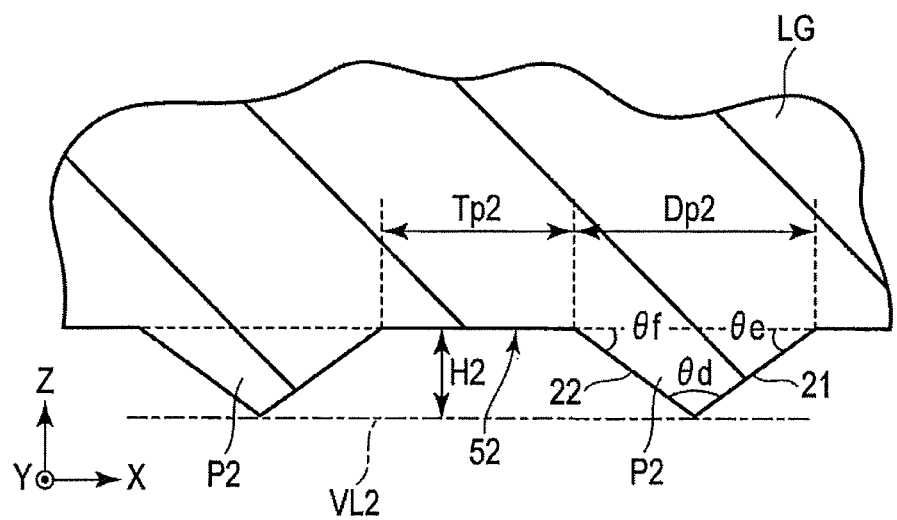
FIG. 6 is an enlarged sectional view of a second prism according to the first embodiment.

FIG. 6 is an enlarged sectional view of the second prism P2. The second prism P2 has a first inclined surface 21 and a second inclined surface 22 and has a triangle cross-section. The angle of the apex between the inclined surfaces 21 and 22 is θd. The angle between the second main surface 52 in the second area A2 and the first inclined surface 21 is θe. The angle between the second main surface 52 in the second area A2 and the second inclined surface 22 is θf. The width of the second prism P2 in the first direction X is Dp2, and the distance between the adjacent second prisms P2 in the first direction X is Tp2. The height of the second prism P2 is H2.

In the example shown in FIG. 6, the angle θd is an obtuse angle and the angles θe and θf are acute angles, and the following inequality: θd>θe, θf is established. The angle θe and the angle θf are, for example, the same as each other (θe=θf). The angle θd and the height H2 of the second prisms P2 formed in the second area A2 may be the same in all of the second prisms P2 or may vary at least in a part of the second prisms P2. Further, the density of the second prisms P2 may be constant or may vary at least in a part of the second prisms P2.

Here, the density of the second prisms P2 can be defined, for example, as the number of the second prisms P2 per unit length. Alternatively, the density of the second prisms P2 can be expressed as the ratio between the width Dp2 of the second prism P2 and the distance Tp2 between the adjacent second prisms P2.

According to the structure of the light guide LG of the present embodiment, unevenness of the intensity of the light output from the first main surface 51 can be prevented, and light having excellent intensity distribution can be emitted to the display panel 2. This effect will be described with reference to FIGS. 7 to 10.

FIG. 7 is a diagram showing brightness distribution of an emission surface in a light guide LGA according to a comparative example. The light guide LGA is a flat plate having a constant thickness from one end on the light source side (left side in the drawing) to the other end (right side in the drawing). That is, the shape of the light guide LGA corresponds to such a shape which has the third area A3 but does not have the first area A1 and the second area A2 of the light guide LG shown in FIG. 4. Nine light sources are arranged along the left side end in the drawing. In this comparative example, the brightness of the emission surface increases with increasing distance from the light sources. In an area near the light sources, a stripe pattern where a high brightness portion and a low brightness portion are alternately arranged in the second direction Y appears.

Figure 9:
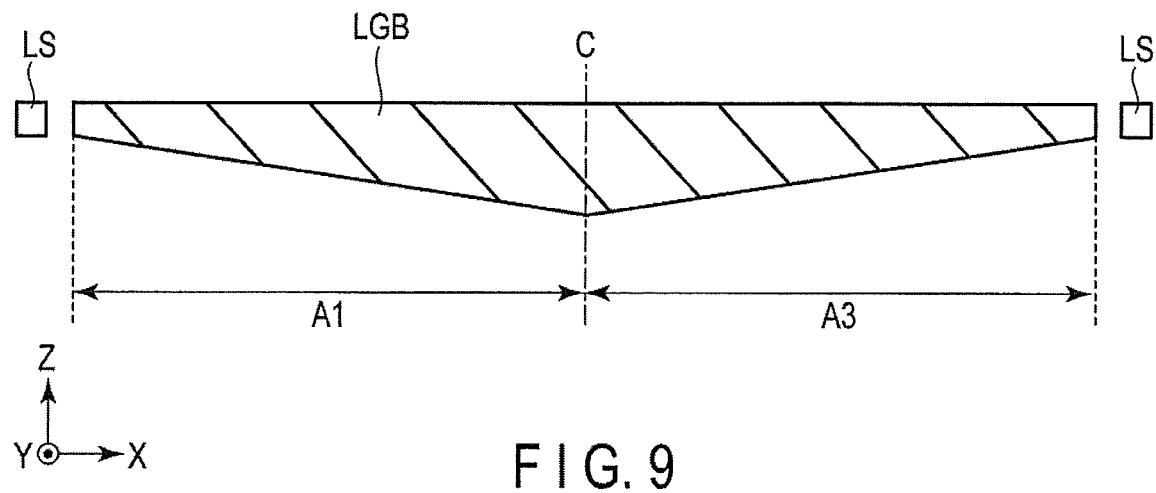
FIG. 9 is a schematic sectional view of the light guide according to the comparative example shown in FIG. 8.

FIG. 8 is a diagram showing brightness distribution of an emission surface in a light guide LGB of another comparative example. FIG. 9 is a schematic sectional view of the light guide LGB. As shown in FIG. 9, the light guide LGB has such a shape that the thickness increases from the left end toward a center C in the first direction X and decreases from the center C toward the right end. That is, the shape of the light guide LGB corresponds to such a shape which has the first area A1 and the third area A3 but does not have the second area A2 of the light guide LG shown in FIG. 4. A plurality of light sources LS are arranged on the left end and the right end, respectively. Although prisms similar to the above-described first prisms P1 and third prisms P3 are provided in the light guide LGB, these prisms are omitted in FIG. 9.

The light of the light sources LS arranged at the left end of the light guide LGB is mainly reflected off the prisms in the third area A3 and is output from the emission surface. Further, the light of the light sources LS arranged at the right end of the light guide LGB is mainly reflected off the prisms in the first area A1 and is output from the emission surface. Therefore, as shown in FIG. 8, brightness reduction near the light sources such as that shown in FIG. 7 will not occur in this comparative example. However, the light reflected off the prisms near the boundary of the areas A1 and A3 is less likely to be output from a position directly above the vicinity of the boundary but is output from a position at a distance from the vicinity of the boundary. Accordingly, the brightness of the emission surface near the center C in the first direction X (the vicinity of the boundary of the areas A1 and A3) is significantly reduced.

Figure 10:
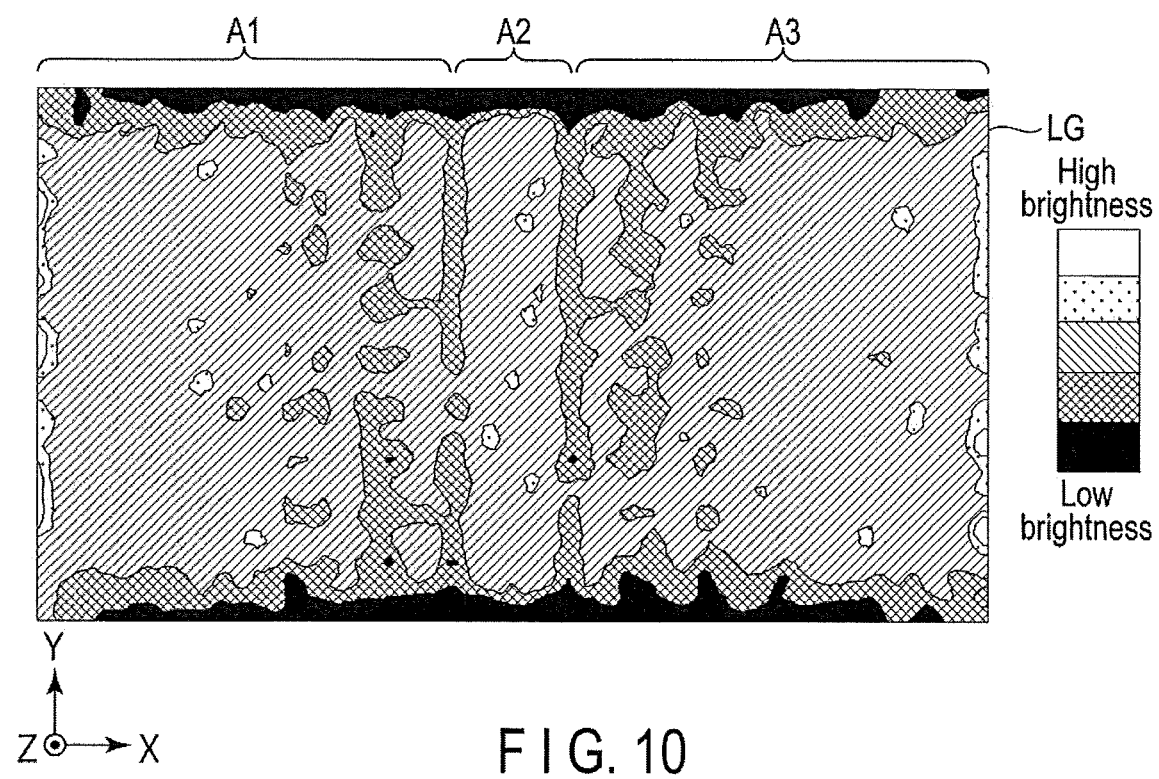
FIG. 10 is a diagram showing an example of brightness distribution of the light guide according to the first embodiment.

FIG. 10 is a diagram showing brightness distribution of the emission surface (first main surface 51) in the light guide LG according to the present embodiment. In the example shown in the drawing, since the second area A2 is provided between the areas A1 and A3, brightness reduction near the center does not occur. That is, since the light from the light sources LS1 and LS2 is also output from the emission surface (first main surface 51) near the center by the second prisms P2 in the second area A2, brightness unevenness such as that shown in FIG. 8 is prevented.

In the brightness distribution shown in FIG. 10, brightness is slightly reduced at the boundary of the areas A1 and A2 and the boundary of the areas A2 and A3. To prevent this brightness reduction, the density or the shape of the second prisms P2 may be adjusted.

FIG. 11 is a diagram showing an example of the adjustment to the density of the second prisms P2. A center C of the second area A2 in the first direction X is shown by dashed-dotted lines. The density of the second prisms P2 increases from the center C toward the boundary of the areas A1 and A2. Further, the density of the second prisms P2 increases from the center C toward the boundary of the areas A2 and A3. In this example, the width Dp2 and the apex angle θd of the second prisms P2 are constant, and the density of the second prisms P2 is adjusted such that the distance Tp2 between the adjacent second prisms P2 increases toward the center C. If the density of the second prisms P2 is increased at the boundary of the areas A1 and A2 and the boundary of the areas A2 and A3, the amount of the light output from the emission surface at these boundaries can be increased.

FIG. 12 is a diagram showing brightness distribution of the emission surface (first main surface 51) in the light guide LG where the density of the second prisms P2 is adjusted as shown in FIG. 11. In this example, brightness reduction such as that shown in FIG. 10 does not occur at the boundary of the areas A1 and A2 and the boundary of the areas A2 and A3. It shows that even better brightness distribution can be achieved by the adjustment of the density of the second prisms P2.

FIG. 13 is a diagram showing an example of the adjustment of the shape of the second prisms P2. In this example, the angle θd of the second prisms P2 decreases from the center C toward the boundary of the areas A1 and A2. Further, the angle θd of the second prisms P2 decreases from the center C toward the boundary of the areas A2 and A3. The width Dp2 and the distance Tp2 are constant across the whole second area A2. Therefore, the height H2 of the second prisms P2 increases from the center C toward the boundary of the areas A1 and A2. Similarly, the height H2 of the second prisms P2 increases from the center C toward the boundary of the areas A2 and A3.

If the angle θd of the second prisms P2 is increased at the boundary of the areas A1 and A2 and the boundary of the areas A2 and A3, the inclined surfaces 21 and 22 shown in FIG. 6 become steep. Therefore, the light reflected off the inclined surfaces 21 and 22 reaches the first main surface 51 more perpendicularly and tends to exit from the first main surface 51. Further, if the height H2 is increased, the areas of the inclined surfaces 21 and 22 are increased. Therefore, the amount of light reflected toward the first main surface 51 is increased by the inclined surfaces 21 and 22. Accordingly, the amount of light output from the emission surface can be increased at the boundary of the areas A1 and A2 and the boundary of the areas A2 and A3 by the adjustment of the angle θd or the height H2. Therefore, in the case of adjusting the shape of the second prisms P2 as shown in FIG. 13, as in the case of adjusting the density, excellent brightness distribution can be obtained.

According to the present embodiment described above, excellent brightness distribution of the first main surface 51 can be achieved by providing the second area A2 in the light guide LG. Further, the display quality of the display device 1 can be improved by using the illumination device 3 equipped with the light guide LG.

In addition, the above-described various favorable effects can be produced from the present embodiment.

Second Embodiment

A second embodiment will be described. Unless otherwise specified, structures and effects are the same as those shown in FIG. 4, etc., of the first embodiment.

FIG. 14 is a diagram schematically showing the structure of the illumination device 3 according to the second embodiment. The illumination device 3 includes a first reflector 60 in addition to the first light source LS1, the second light source LS2 and the light guide LG. The first reflector 60 is a sheet member formed of a metal material, for example, and is opposed to the second main surface 52 of the light guide LG. The first reflector 60 reflects light leaking from the second main surface 52 of the light guide LG toward the light guide LG. Note that the prisms on the second main surface 52 are omitted in FIG. 14, however the light guide LG includes the prisms same as in the first embodiment.

The first reflector 60 has a first portion 61 opposed to the first area A1, a second portion 62 opposed to the second area A2, and a third portion 63 opposed to the third area A3. In the present embodiment, all of the portions 61 to 63 extend on the same X-Y plane. The first portion 61 is nonparallel to the first area A1. The second portion 62 is parallel to the second area A2. The third portion 63 is nonparallel to the third area A3.

Figure 15:
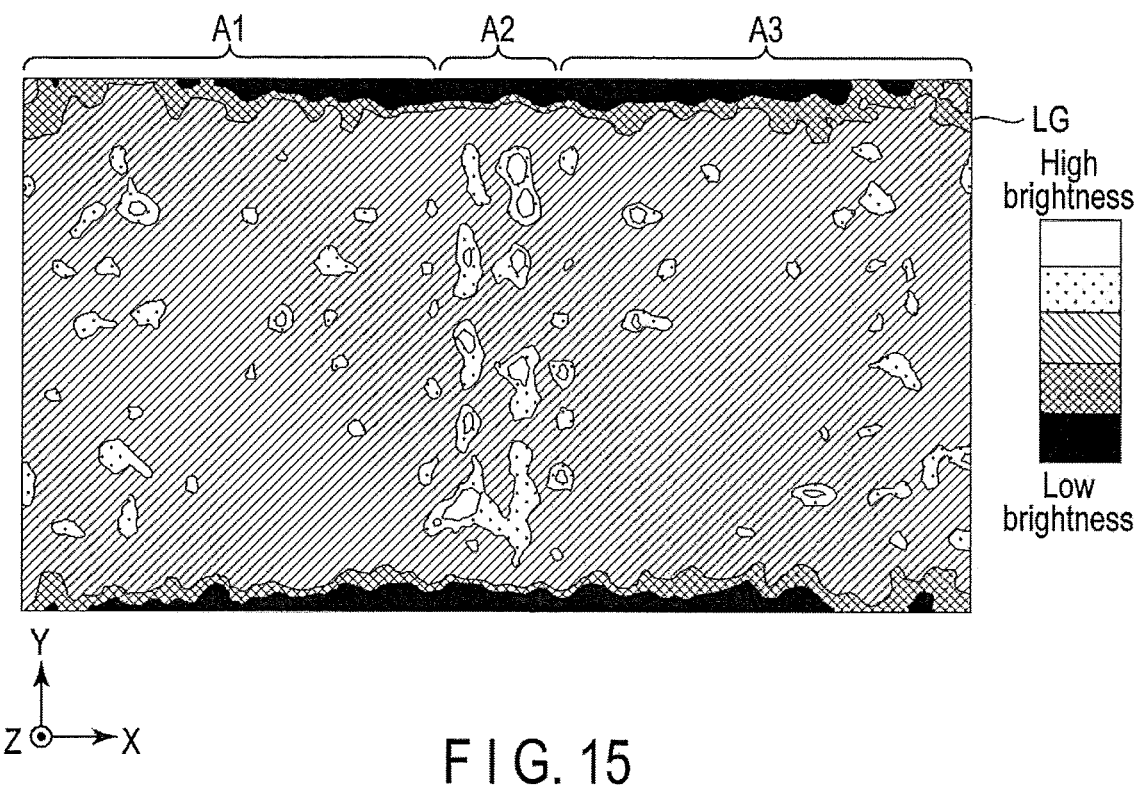
FIG. 15 is a diagram showing an example of brightness distribution of a light guide according to the second embodiment.

FIG. 15 is a diagram showing the brightness distribution of the emission surface of the light guide LG in the structure of the second embodiment. As is evident from the brightness distribution, in the case of providing the first reflector 60 also, as in the case of the first embodiment, excellent brightness distribution can be obtained. Further, when the first reflector 60 is provided, the light leaking from the second main surface 52 of the light guide LG can be reused, and thus the overall brightness of the first main surface 51 can be increased.

Third Embodiment

A third embodiment will be described. Unless otherwise specified, structures and effects are the same as those of the above-described embodiments.

Figure 16:
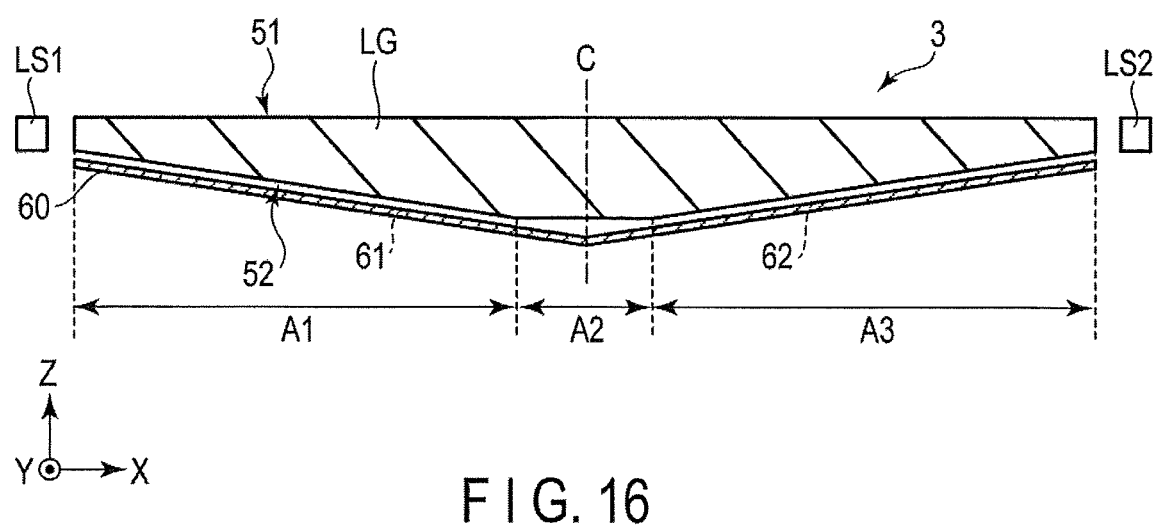
FIG. 16 is a diagram schematically showing the structure of an illumination device according to a third embodiment.

FIG. 16 is a diagram schematically showing the structure of the illumination device 3 according to the third embodiment. As in the case of the second embodiment, the illumination device 3 includes the first reflector 60. In FIG. 16, the center C of the second area A2 in the first direction X is shown by dashed-dotted lines.

The first reflector 60 has the first portion 61 and the second portion 62. The first portion 61 is opposed to the whole first area A1 and a half of the second area A2 on the first area A1 side from the center C. The second portion 62 is opposed to the whole third area A3 and a half of the second area A2 on the third area A3 side from the center C. The first portion 61 is parallel to the first area A1 and is nonparallel to the second area A2. The second portion 62 is parallel to the third area A3 and is nonparallel to the second area A2.

Figure 17:
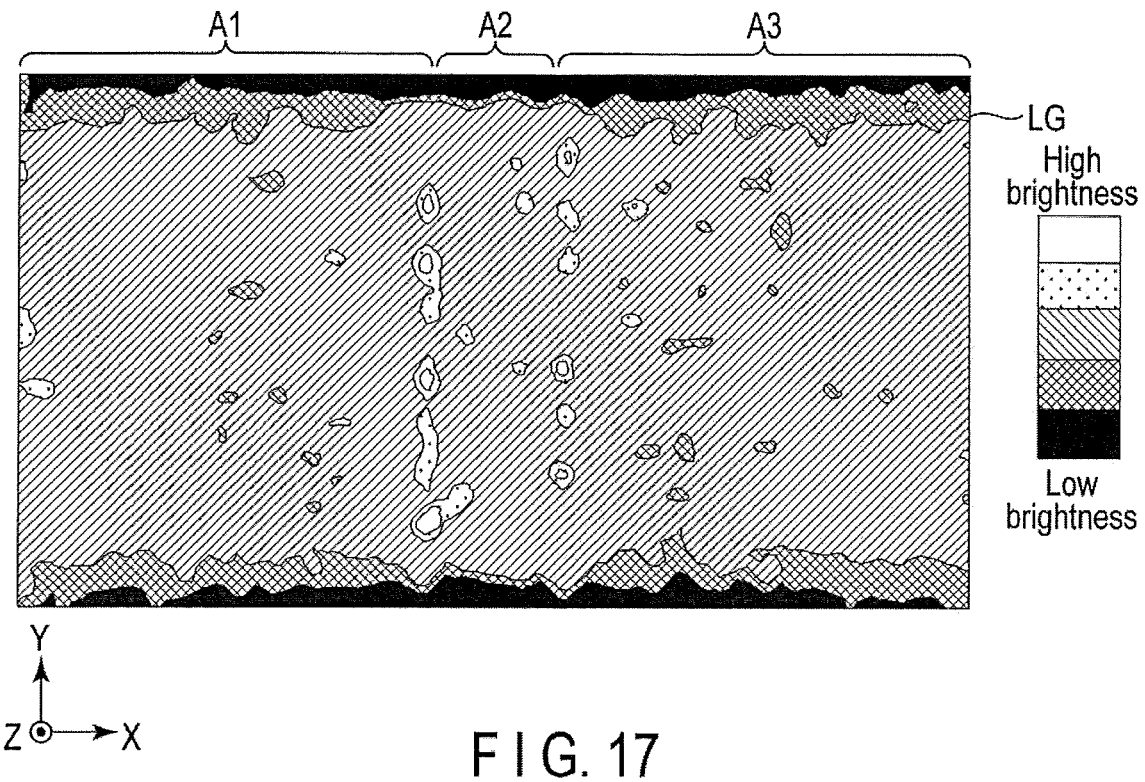
FIG. 17 is a diagram showing an example of brightness distribution of a light guide according to the third embodiment.
Figure 18:
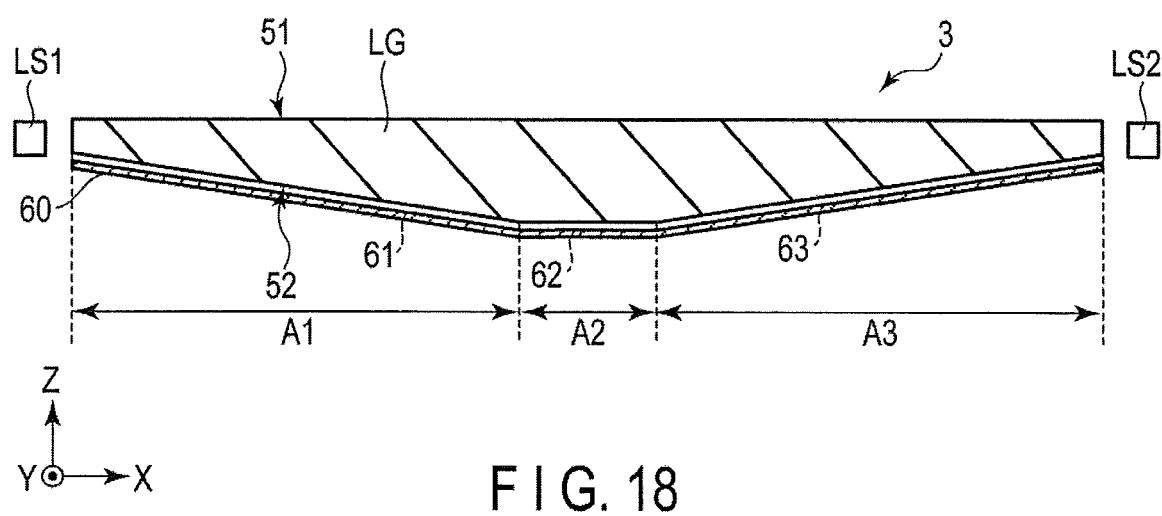
FIG. 18 is a diagram schematically showing the structure of an illumination device according to a modification of the third embodiment.

FIG. 17 is a diagram showing the brightness distribution of the emission surface of the light guide LG in the structure of the third embodiment. As in the case of FIG. 15, excellent brightness distribution can be obtained. Further, as compared to FIG. 15, uniformity of the brightness distribution is increased. Therefore, as in the present embodiment, the first reflector 60 should preferably be arranged parallel to the first area A1 and the third area A3. Note that the second portion 62 may be formed parallel to the second area A2 as shown in FIG. 18.

Fourth Embodiment

A fourth embodiment will be described. Unless otherwise specified, structures and effects are the same as those of the above-described embodiments.

Figure 19:
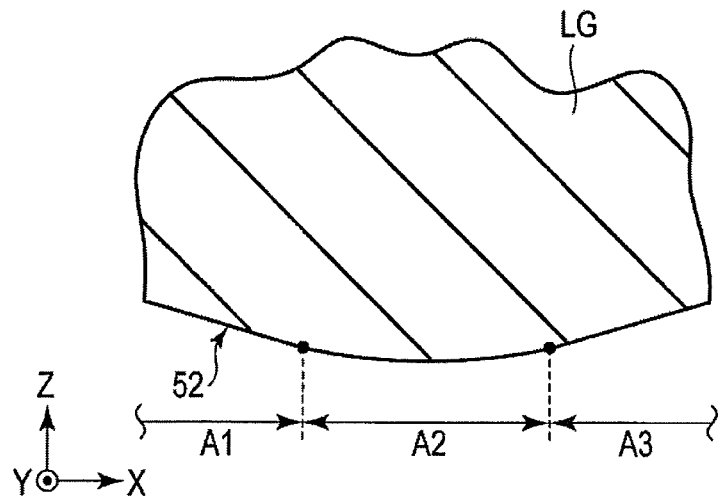
FIG. 19 is a schematic sectional view of a light guide according to a fourth embodiment.

FIG. 19 is a diagram schematically showing a part of the light guide LG according to the fourth embodiment. Here, illustrations of the prisms P1, P2 and P3 are omitted. As shown in the drawing, the light guide LG has the curved second main surface 52 in the second area A2. If the second area A2 is formed in this manner, changes in the second main surface 52 at the boundary of the areas A1 and A2 and the boundary of the areas A2 and A3 become smooth. Therefore, changes in the brightness distribution on the first main surface 51 also become smooth, and local brightness reduction can be prevented.

Fifth Embodiment

A fifth embodiment will be described. Unless otherwise specified, structures and effects are the same as those of the above-described embodiments.

Figure 20:
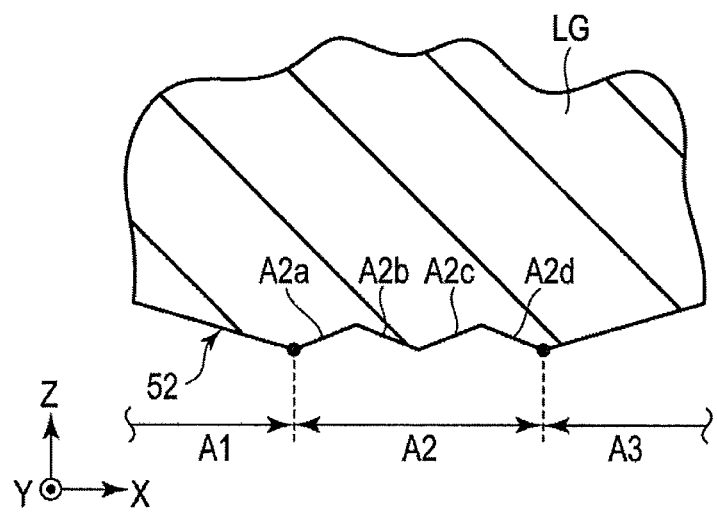
FIG. 20 is a schematic sectional view of a light guide according to a fifth embodiment.

FIG. 20 is a diagram schematically showing a part of the light guide LG according to the fifth embodiment. As shown in the drawing, the light guide LG has a plurality of inclined surfaces A2$a$, A2$b$, A2$c$ and A2$d$ in the second area A2. The inclined surfaces A2$a$, A2$b$, A2$c$ and A2$d$ are arranged from the boundary of the areas A1 and A2 to the boundary of the areas A2 and A3 in this order. The inclined surfaces A2$a$, A2$b$, A2$c$ and A2$d$ are formed in the cross-sectional shape shown in the drawing and extend parallel to the second direction Y, for example.

The inclined surface A2$a$ is inclined with respect to the X-Y plane at an angle different from that of the first area A1. The inclined surface A2$b$ is inclined with respect to the X-Y plane at an angle different from that of the inclined surface A2$a$. The inclined surface A2$c$ is inclined with respect to the X-Y plane at an angle different from that of the inclined surface A2$b$. The inclined surface A2$d$ is inclined with respect to the X-Y plane at an angle different from those of the inclined surface A2$c$ and the third area A3. Although the second prisms P2 are omitted in the drawing, the second prisms P2 are formed on the inclined surfaces A2$a$, A2$b$, A2$c$ and A2$d$, respectively.

Although FIG. 20 shows an example where the inclined surfaces A2$a$, A2$b$, A2$c$ and A2$d$ are arranged in the first direction X, a plurality of inclined surfaces arranged in the second direction Y may be formed in the second area A2. Further, the number of the inclined surfaces is not limited to four and may be two or three or may also be five or more. Still further, the second area A2 may have a surface parallel to the X-Y plane in addition to the inclined surfaces.

Sixth Embodiment

A sixth embodiment will be described. Unless otherwise specified, structures and effects are the same as those of the above-described embodiments.

Figure 21:
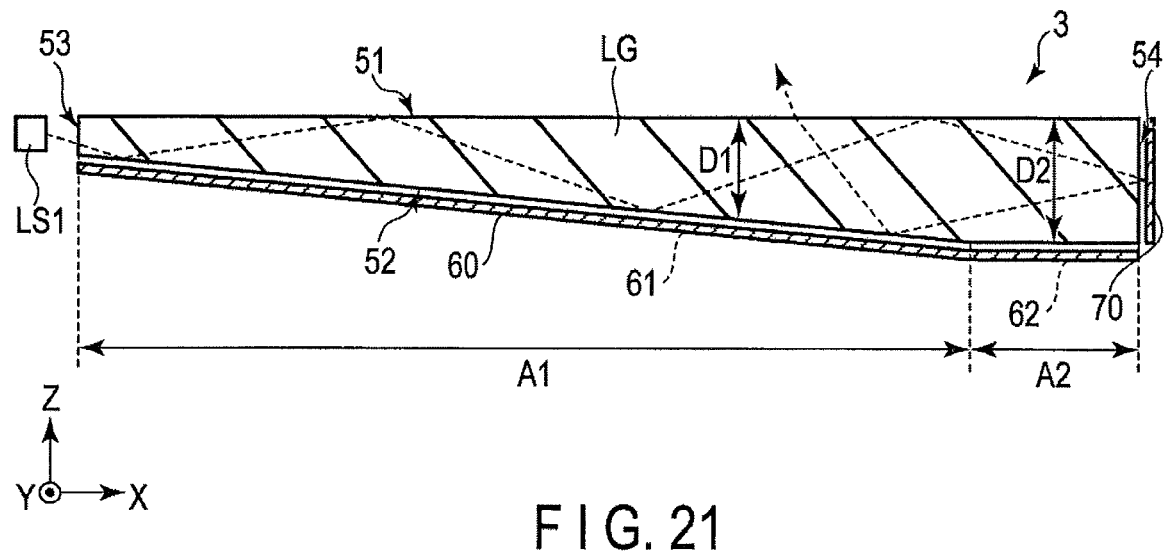
FIG. 21 is a schematic sectional view of an illumination device according to a sixth embodiment.

FIG. 21 is a diagram schematically showing the illumination device 3 according to the sixth embodiment. The illumination device 3 includes the light guide LG, the first light source LS1 and the first reflector 60. The illumination device 3 does not include the second light source LS2. The second main surface 52 of the light guide LG has the first area A1 and the second area A2. Although not shown in the drawing, the first prisms P1 are formed in the first area A1, and the second prisms P2 are formed in the second area A2.

The thickness of the light guide LG in the first area A1, i.e., the distance D1 increases from the first side surface 53 toward the boundary of the areas A1 and A2. In the example shown in FIG. 21, the thickness of the light guide LG in the second area A2, i.e., the distance D2 is constant. As in the case of the first embodiment, the distance D2 is greater than the distance D1 at any position in the first area A1 (D2>D1).

The first reflector 60 has the first portion 61 opposed to the first area A1 and the second portion 62 opposed to the second area A2. The first portion 61 is parallel to the first area A1, and the second portion 62 is parallel to the second area A2. As in the case of FIG. 14, the first portion 61 may not be parallel to the first area A. Further, as in the case of FIG. 16, the second portion 62 may not be parallel to the second area A2.

The illumination device 3 further includes a second reflector 70. The second reflector 70 is a sheet member formed of a metal material, for example, and is opposed to the second side surface 54 of the light guide LG. The second reflector 70 is parallel to the second side surface 54.

In FIG. 21, an example of the optical path of the light emitted from the first light source LS1 is shown by dashed lines. The light emitted from the first light source LS1 enters the light guide LS from the first side surface 53. When the first area A1 is inclined as shown in FIG. 21, the light is emitted to the first area A1 at a small angle and is less likely to be deviated from the total inner reflection conditions of the main surfaces 51 and 52. Therefore, the light travels through the light guide LG while being reflected off the main surfaces 51 and 51 and then reaches the second side surface 54. The light may be emitted from the second side surface 54, but as being reflected by the second reflector 70, the light enters the light guide LG again. The light returned to the light guide LG is reflected off the first prisms P1 in the first area A1 and the second prisms P2 in the second area A, and is deviated from the total inner reflection condition of the first main surface 51 and emitted from the first main surface 51.

If the second area A2 is not provided, the intensity of the light reflected by the second reflector 70 significantly decreases near the second side surface 54, and the brightness of the first main surface 51 becomes uneven. On the other hand, if the second area A2 is provided, as in the case of the first embodiment, such brightness unevenness can be prevented, and the uniformity of the brightness distribution of the first main surface 51 can be improved.

Seventh Embodiment

A seventh embodiment will be described. Unless otherwise specified, structures and effects are the same as those of the above-described embodiments.

FIG. 22 is a schematic sectional view of a part of the illumination device 3 according to the seventh embodiment. The illumination device 3 includes the light guide LG, the first light source LS1 and the first reflector 60.

In the present embodiment, the first side surface 53 has an incidence surface 53a and an end surface 53b. The incidence surface 53a is inclined at an angle θin with respect to the first main surface 51. The angle θin is an acute angle greater than the inclination angle of the above-described first virtual line VL1 with respect to the first main surface 51, i.e., the first angle θ1 (θ1<θin<90°). The end surface 53b is, for example, a flat surface parallel to the Y-Z plane.

In the example shown in FIG. 22, the incidence surface 53a is a flat surface, but the incidence surface 53a may be a curved surface instead. Further, the first side surface 53 may not have the end surface 53b.

The light emission direction of the first light source LS1, i.e., the first emission direction DL1 is inclined with respect to the first main surface 51. That is, in the present embodiment, the first emission direction DL1 does not coincide with the first direction X in a sectional view. However, the first emission direction DL1 coincides with the first direction X in a plan view.

The first light source LS1 overlaps the light guide LG in the thickness direction of the light guide LG (third direction Z). In the example shown in FIG. 22, the first light source LS1 entirely overlaps the light guide LG, but the first light source LS1 may partially overlap the light guide LG instead.

In the above-described structure also, the same effects as those of the above-described embodiments can be produced. Further, by arranging the first light source LS1 in a space under the light guide LG, the illumination device 3 and the display device 1 can be downsized, and the frame region can be narrowed.

Note that structures similar to those of the first side surface 53 and the first light source LS1 described in the present embodiment can be applied to the structures of the second side surface 54 and the second light source LS2.

Eighth Embodiment

An eighth embodiment will be described. Unless otherwise specified, structures and effects are the same as those of the above-described embodiments.

Figure 23:
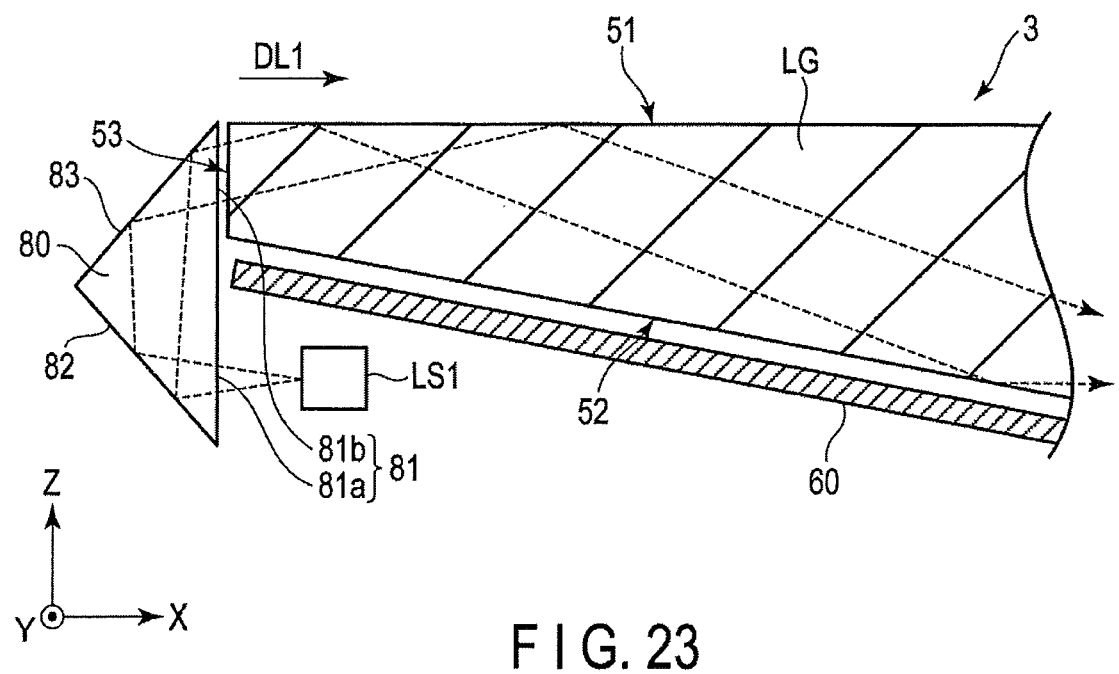
FIG. 23 is a schematic sectional view of a part of an illumination device according to an eighth embodiment.

FIG. 23 is a schematic sectional view of a part of the illumination device 3 according to the eighth embodiment. The illumination device 3 includes the light guide LG, the first light source LS1 and the first reflector 60. The structures of the above-described embodiments can be applied to the light guide LG and the first reflector 60.

The first light source LS1 overlaps the light guide LG in the thickness direction (third direction Z) of the light guide LG. In the example shown in FIG. 23, the first light source LS1 entirely overlaps the light guide LG, but the first light source LS1 may partially overlap the light guide LG instead.

Further, the illumination device 3 includes a bending member (refractor) 80 which is arranged near the first side surface 53 of the light guide LG. The bending member 80 shown in FIG. 23 is a prism having a triangle cross-section on the X-Y plane and extending in the second direction Y. More specifically, the bending member 80 has a first surface 81, a second surface 82 and a third surface 83. For example, the bending member 80 may be provided for each of the first light sources LS1 arranged in the second direction Y as shown in FIG. 3. Further, one bending member 80 may be provided for every two or more first light sources LS1, or one bending member 80 may be provided for all the first light sources LS1.

The first surface 81 has an incidence area 81a and an emission area 81b. The incidence area 81a is opposed to the first light source LS1. The emission area 81b is opposed to the first side surface 53 of the light guide LG. In the example shown in FIG. 23, the first surface 81 is parallel to the third direction Z, but the first surface 81 may be inclined with respect to the third direction Z instead. The second surface 82 and the third surface 83 are inclined at predetermined angles with respect to the first surface 81. The angle between the second surface 82 and the first surface 81 and the angle between the third surface 83 and the first surface 81 may be the same or may be different from each other.

The light emitted from the first light source LS1 enters the bending member 80 from the incidence area 81a. This incident light is reflected off the second surface 82, then reflected off the third surface 83, and emitted from the emission area 81b. The emission light is emitted to the first side surface 53 of the light guide LG in the first emission direction DL1 and transmitted through the light guide LG while being reflected off the main surfaces 51 and 52 of the light guide LG. As described above, in the present embodiment, the optical path of the light emitted from the first light source LS1 is bent to the first emission direction DL1 in the bending member 80 and emitted to the light guide LG.

In the above-described structure also, the same effects as those of the above-described embodiments can be produced. Further, by using the bending member 80 as in the present embodiment, flexibility of the arrangement position of the first light source LS1 is increased. Therefore, by arranging the first light source LS1 in a space under the light guide LG as shown in FIG. 23, for example, the illumination device 3 and the display device 1 can be downsized, and the frame region can be narrowed.

Although an example where the bending member 80 is a prism is shown in FIG. 23, the bending member 80 may be a reflector (mirror member) having a shape corresponding to the second surface 82 and the third surface 83.

Alternatively, the bending member 80 may have such a structure that the bending member 80 reflects the light from the first light source LS1 only one time and emits the light to the first side surface 53, or may have such a structure that the bending member 80 reflects the light three or more times and then emits the light to the first side surface 53.

The first side surface 53 may include the incidence surface 53a inclined with respect to the first main surface 51 as shown in FIG. 22. In this case, the bending member 80 may have such a structure that the bending member 80 bends the optical path of the light from the first light source LS1 in such a manner as to emit the light to the incidence surface 53a.

The structure near the first light source LS1 described in the present embodiment can also be applied to the structure of the second light source LS2 side.

Ninth Embodiment

A ninth embodiment will be described. Unless otherwise specified, structures and effects are the same as those of the above-described embodiments.

Figure 24:
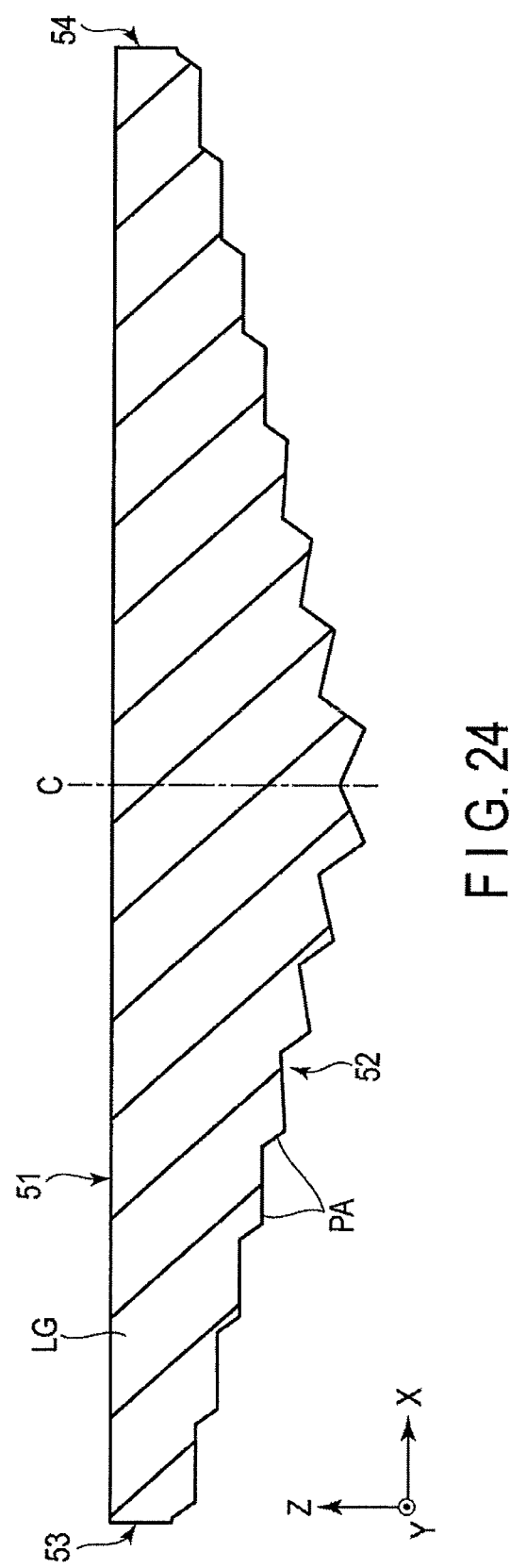
FIG. 24 is a schematic sectional view of a light guide according to a ninth embodiment.

FIG. 24 is a schematic sectional view of the light guide LG according to the ninth embodiment. In the example shown in the drawing, the thickness of the light guide LG gradually decreases from the center C in the first direction X toward the first side surface 53 and the second side surface 54. A plurality of prisms PA are provided on the second main surface 52 of the light guide LG. The general shape of the light guide LG is line-symmetrical with respect to the center C but is not limited to this example.

FIG. 25 is an enlarged sectional view of a part of the light guide LG shown in FIG. 24. In the example shown in the drawing, eight prisms PA (PA1 to PA8) are provided from the first side surface 53 to the center C. However, the number of the prisms PA provided from the first side surface 53 to the center C is not limited to eight.

The prism PA has a first inclined surface 13 and a second inclined surface 14 and has a triangle cross-section. The angle between the first inclined surface 13 and the second main surface 52 is α. The angle between the second inclined surface 14 and the second main surface 52 is β. In the example shown in FIG. 25, the adjacent prisms PA are not spaced apart from each other. In this case, for example, a plane which connects the ends of the dips between the adjacent prisms PA can be defined as the second main surface 52. Note that the adjacent prisms PA may be spaced apart from each other instead.

In the example shown in FIG. 25, the prisms PA1 to PA4 have the same shape. The first inclined surfaces 13 of the prisms PA1 to PA4 are parallel to the first main surface 51.

On the other hand, the shapes of the prisms PA5 to PA8 are different from the shapes of the prisms PA1 to PA4, and further, the prisms PA5 to PA8 have different shapes from each other. More specifically, regarding the angles α of the prisms PA5 to PA8, the prism PA closer to the center C has the greater angle α. Therefore, the first inclined surfaces 13 of the prisms PA5 to PA8 are inclined with respect to the first main surface 51 at acute angles. Further, the heights of the prisms PA5 to PA8 is greater than the heights of the prisms PA1 to PA4, and regarding the heights of the prisms PA5 to PA8, the prism PA closer to the center C has the greater height. The angles β of the prisms PA1 to PA8 are the same as each other, for example, but may be different from each other instead.

Here, attention will be focused on the first virtual line VL11 which connects the apexes of the prisms PA1 to PA4 and the second virtual line VL12 which connects the apexes of the prisms PA7 and PA8. The first virtual line VL11 is inclined with respect to the first main surface 51 at a first angle θ11. The second virtual line VL12 is inclined with respect to the first main surface 51 at a second angle θ12.

All the prisms PA1 to PA4 have the same height. On the other hand, since the prisms PA7 and PA8 have different angles α, the height of the prism PA8 is greater than the height of the prism PA7 in the example shown in FIG. 25. Therefore, the second angle θ12 is greater than the first angle θ11 (θ12>θ11). From another perspective, the second virtual line VL12 in an area (second area) provided with the prisms PA7 and PA8 is inclined with respect to the first virtual line VL11 in an area (first area) provided with the prisms PA1 to PA4.

Although attention has been focused on the prisms PA7 and the PA8, also when the second virtual line VL12 is defined by focusing on the prisms PA4 and PA5, the prisms PA5 and PA6 or the prisms PA6 and PA7, the second virtual line VL12 is inclined with respect to the first virtual line VL11.

The structure of the prism PA provided between the first side surface 53 and the center C can also be applied to the structure of the prism PA provided between the second side surface 54 and the center C.

According to the structure of the present embodiment, since the prism PA closer to the center C has the greater angle α, and the light reflected off the first inclined surface 13 is more likely to be emitted from the first main surface 51. Therefore, brightness reduction near the center C such as that shown in FIG. 8 can be prevented.

Based on the illumination device and the display device described above in the embodiments of the present invention, a person having ordinary skill in the art can implement the illumination device and the display device in various forms with appropriate design changes; however, all such illumination devices and display devices come with the scope of the present invention as long as they have the spirit of the present invention.

A person having ordinary skill in the art may conceive of various modifications within the technical scope of the present invention; however, such modifications also come within the scope of the present invention. For example, a person having ordinary skill in the art may appropriately make additions, deletions and/or design changes of structural elements or additions, omission and/or condition changes of manufacturing processes with respect to the above-described embodiments; however, such modifications also come within the scope of the present invention as long as they have the spirit of the present invention.

Still further, regarding other technical effects to be produced from the forms described in the embodiments, technical effects obvious from the description and technical effects appropriately conceivable by a person having ordinary skill in the art are also regarded as the technical effects to be produced from the present invention as a matter of course.

What is claimed is:
1. An illumination device comprising:
  a light guide having a first side surface, a first main surface and a second main surface opposite to the first main surface;
  a first light source which emits light to the first side surface of the light guide in a first emission direction; and
  a plurality of prisms provided on the second main surface, wherein
  the second main surface has a first area and a second area which are arranged in order in the first emission direction,
  the prisms include a plurality of first prisms in the first area and a plurality of second prisms in the second area,
  a first virtual line connecting apexes of only the first prisms is inclined with respect to the first main surface in a sectional view,
  in the second area, the second main surface has at least three of the second prisms, and is formed parallel to the first main surface in sectional view,
  the second prisms do not constitute the first virtual line,
  a distance between the second area and the first main surface is greater than a distance between the first area and the first main surface in a sectional view,
  the first prisms and the second prisms have different shapes from each other, and the first prisms and the second prisms are arranged at different densities from each other.

2. The illumination device of claim 1, wherein
a second virtual line connecting apexes of the second prisms is inclined with respect to the first virtual line.

3. The illumination device of claim 2, wherein
the second virtual line is parallel to the first main surface.

4. The illumination device of claim 1, wherein
the light guide has a second side surface opposite to the first side surface, the illumination device further comprising
a second light source which emits light to the second side surface of the light guide, wherein
the second main surface has the first area, the second area and a third area which are arranged in order in the first emission direction,
the prisms include a plurality of third prisms in the third area,
a third virtual line connecting apexes of the third prisms is inclined with respect to the first virtual line in sectional view, and
a distance between the second area and the first main surface is greater than a distance between the third area and the first main surface in a sectional view.

5. The illumination device of claim 1, wherein
the second prisms have different densities, different apex angles or different heights from each other, at least in a part of the second prisms.

6. The illumination device of claim 5, wherein
a part of the second prisms closer to a boundary of the first area and the second area has a higher density or a greater height than at least another part of the second prisms.

7. The illumination device of claim 5, wherein
a part of the second prisms closer to a boundary of the first area and the second area has a smaller apex angle than at least another part of the second prisms.

8. The illumination device of claim 1, wherein
the first light source is a laser light source which emits laser light.

9. The illumination device of claim 1, further comprising
a first reflector opposed to the second main surface, wherein
the first reflector includes a first portion opposed to the first area and a second portion opposed to the second area, and
the first portion is parallel to the first area.

10. The illumination device of claim 1, wherein
the light guide has a second side surface opposed to the first side surface, the illumination device further comprising
a second reflector which is opposed to the second side surface and reflects light of the first light source emitted from the second side surface back to the second side surface.

11. The illumination device of claim 1, wherein
the first emission direction is inclined with respect to the first main surface,
the first side surface has an incidence surface which light emitted from the first light source enters,
the incidence surface is inclined with respect to the first main surface at an acute angle greater than an angle at which the first virtual line is inclined with respect to the first main surface.

12. The illumination device of claim 11, wherein
at least a part of the first light source overlaps the light guide in a thickness direction of the light guide.

13. A display device comprising an illumination device and a display panel, the illumination device comprising:
a light guide having a first side surface, a first main surface and a second main surface opposite to the first main surface;
a first light source which emits light to the first side surface of the light guide in a first emission direction; and
a plurality of prisms provided on the second main surface, wherein
the second main surface has a first area and a second area which are arranged in order in the first emission direction,
the prisms include a plurality of first prisms in the first area and a plurality of second prisms in the second area,
a first virtual line connecting apexes of only the first prisms is inclined with respect to the first main surface in a sectional view,
in the second area, the second main surface has at least three of the second prisms, and is formed parallel to the first main surface in sectional view,
the second prisms do not constitute the first virtual line,
a distance between the second area and the first main surface is greater than a distance between the first area and the first main surface in a sectional view,
the first prisms and the second prisms have different shapes from each other, and
the first prisms and the second prisms are arranged at different densities from each other.

14. The display device of claim 13, wherein
a second virtual line connecting apexes of the second prisms is inclined with respect to the first virtual line.

15. The display device of claim 14, wherein
the second virtual line is parallel to the first main surface.

16. The display device of claim 13, wherein
the light guide has a second side surface opposite to the first side surface,
the illumination device further comprises a second light source which emits light to the second side surface of the light guide,
the second main surface has the first area, the second area and a third area which are arranged in order in the first emission direction,
the prisms include a plurality of third prisms in the third area,
a third virtual line connecting apexes of the third prisms is inclined with respect to the first virtual line in sectional view, and
a distance between the second area and the first main surface is greater than a distance between the third area and the first main surface in a sectional view.

* * * * *